INVENTORS
F.W. BRIXNER, N.A. STILLMAN
BY AND H.C. SIBLEY
Forest B. Hitchcock
THEIR ATTORNEY INVENTORS
F.W.BRIXNER, N.A.STILLMAN
AND H.C.SIBLEY
BY [signature]
THEIR ATTORNEY Feb. 7, 1967 F. W. BRIXNER ETAL 3,303,470

CENTRAL TO REMOTE SIGNALLING SYSTEM HAVING ROLL CALL INTERROGATION

Filed June 7, 1962 11 Sheets-Sheet 3

| STEP | CT | C1 | C2 | C3 | C4 |
|---|---|---|---|---|---|
| 1 | B | ↑ | ↓ | ↓ | ↓ |
| 2 | A | ↑ | ↑ | ↓ | ↓ |
| 3 | B | ↑ | ↑ | ↑ | ↓ |
| 4 | A | ↑ | ↓ | ↑ | ↓ |
| 5 | B | ↑ | ↓ | ↑ | ↑ |
| 6 | A | ↑ | ↑ | ↑ | ↑ |
| 7 | B | ↑ | ↑ | ↓ | ↑ |
| 8 | A | ↑ | ↓ | ↓ | ↑ |
| 9 | B | ↓ | ↓ | ↓ | ↑ |
| 10 | A | ↓ | ↑ | ↓ | ↑ |
| 11 | B | ↓ | ↑ | ↑ | ↑ |
| 12 | A | ↓ | ↓ | ↑ | ↑ |
| 13 | B | ↓ | ↓ | ↑ | ↓ |
| 14 | A | ↓ | ↑ | ↑ | ↓ |
| 15 | B | ↓ | ↑ | ↓ | ↓ |
| LATCHED | A | ↓ | ↓ | ↓ | ↓ |

*INVENTORS*
F. W. BRIXNER, N. A. STILLMAN
AND H. C. SIBLEY

*BY* Forest B. Hitchcock

THEIR ATTORNEY

INVENTORS
F.W. BRIXNER, N.A. STILLMAN
AND H.C. SIBLEY
BY
Forest B. Hitchcock
THEIR ATTORNEY INVENTORS
F.W. BRIXNER, N.A. STILLMAN
AND H.C. SIBLEY
BY
Forest W. Hitchcock
THEIR ATTORNEY

INVENTORS
F.W. BRIXNER, N.A. STILLMAN
AND H.C. SIBLEY
BY
THEIR ATTORNEY

INVENTORS
F.W.BRIXNER, N.A.STILLMAN
BY AND H.C.SIBLEY
Forest B. Hitchcock
THEIR ATTORNEY INVENTORS
F.W.BRIXNER, N.A.STILLMAN
AND H.C.SIBLEY
BY Forest B. Hitchcock
THEIR ATTORNEY

*INVENTORS*
F.W.BRIXNER, N.A.STILLMAN
*BY* AND H.C.SIBLEY
Forest B. Hitchcock
THEIR ATTORNEY INVENTORS
F. W. BRIXNER, N.A. STILLMAN
AND H.C.SIBLEY
BY
Forest B. Hitchcock
THEIR ATTORNEY 3,303,470

CENTRAL TO REMOTE SIGNALLING SYSTEM HAVING ROLL CALL INTERROGATION

Frederick W. Brixner, Rochester, Neil A. Stillman, East Rochester, and Henry C. Sibley, Spencerport, N.Y., assignors to General Signal Corporation, a corporation of New York Filed June 7, 1962, Ser. No. 200,874
7 Claims. (Cl. 340—163)

The present invention relates to an improved code communication system, and more particularly to an improved system wherein distinct operating cycles of information are transmitted from and to a central office for controlling various devices at a remote area and for indicating at the central office the condition of the various devices.

In one specific aspect, the present invention relates to an improved system having means for at times transmitting from a central office to a selected one of a plurality of field stations, a distinct control cycle, comprised of a series of code elements, to control a plurality of devices associated with a selected field station; and also having means for at times transmitting from any one of the field stations to the central office, a distinct indication code cycle, comprising a series of code elements, to indicate at the central office the operated condition of the various devices associated with the transmitting field station.

Code communication systems now commonly used in centralized traffic control systems for railways, wherein controls and indications are communicated between a central office and a plurality of field stations may be of a first type, whereby an operating cycle is transmitted only in response to a change in position of a control lever at the central office or a change in condition of a device, or occupancy of a track section at one of the outlying field stations. It is understood that in this first type of system, it is necessary to provide either a means for permitting only one field station to transmit an indication cycle at one time, or to provide distinct communication channels and associated receiving apparatus at the central office for the several field stations, the latter being impractical in large installations with a great number of field stations. It is also desirable in this first type of system that means be provided to prevent each station from repeating an indication cycle to the exclusion of another field station having an indication cycle to transmit. In the so-called simplex systems, of this first type, that is, where only one operating cycle, either a control or an indication cycle, can be transmitted at any one time, means must also be provided for preventing the central office and a field station from transmitting at the same time. Although, relatively elaborate circuit refinements and coding and decoding means are necessary to provide the above features, in this first type of system, the information is transmitted only when necessary, and they have proved to be extremely reliable in practice.

More recently, a second type of system has been provided, wherein each separate device is in effect, scanned in turn, so that coded indication information is constantly being transmitted to the central office regardless of the change in condition of the devices. This, of course, eliminates the need for preventing more than one field station from transmitting because the indications are constantly being transmitted for each device in turn.

Although, this second type of system requires a separate communication channel and apparatus for providing the control cycle function, indications are received at the central office at a rapid rate and optimum reliability may still be obtained for the transmission of controls; and since in this second type of system the indication and control cycle apparatus is separate, the problems of transmitting control information and indication information at the same time is eliminated.

The purposes of the present invention is to provide an improved code communication system which has the advantages of the first mentioned type of system in that it is reliable in the communication of both indications and controls using a minimum of apparatus and communication channels; and also has the advantages of the second type of system in that it is unnecessary to include elaborate circuit arrangements and code limitations to prevent the simultaneous transmission by more than one field station or to prevent the transmission of a control cycle and an indication cycle at one time. This all being accomplished without duplexing the information and without the necessity of scanning each individual device to be indicated.

One of the objects of the present invention is to provide an improved code communication system of the scanning type wherein only the individual field stations are repeatedly scanned by the central office for a change in any one of a plurality of devices associated with each field station.

Another object of the present invention is to provide an improved communication system wherein the same communication channel that is used for scanning the field stations is also used for the communication of an operating cycle.

Another object of this invention is to provide an improved simplex type code communication system wherein a control cycle may be effectively communicated to any field station at any time independent of the scanning of the field stations and yet is controlled in accordance with the scanning signal so that a control cycle and an indication cycle can not be transmitted at the same time.

A further object of this invention is to provide an improved code communication system wherein a field station having information to transmit responds to a predetermined scanning signal by transmitting a complete indication cycle prior to the transmission of a subsequent scanning signal.

A further object of this invention is to provide an improved code communication system wherein scanning signals not only prevent more than one field station from transmitting an indication cycle at any one time, but also, prevents a control cycle and an indication cycle from being transmitted at the same time.

A still further object of this invention is to provide an improved simplex type code communication system having means for discriminating between an interruption in the transmission of scanning signals for the communication of the operating cycles and an interruption in the transmission of scanning signals for resetting and synchronizing the apparatus for counting the signals.

A still further object of this invention is to provide an improved code communication system of the type herein described which operates effectively over commercial telephone circuits, which does not require share-the-line operation when telephones selectors are employed in the same line circuit, and does not require low pass filters when other services such as voice and carrier are employed on the same line circuit with the code communication system.

Other objects of this invention will become apparent from the specification, the drawings, and the appended claims.

In the drawings:

FIG. 1 is a block diagram illustrating the general organization of a code communication system according to one embodiment of the present invention;

FIGS. 2A and 2B when placed side by side illustrate partly in block form and partly schematically central office apparatus and circuitry according to one embodiment of the invention;

FIG. 3 illustrates a chart showing the various positions of the stepping relays for counting the steps of the control and indication cycle in the system of the present invention;

FIGS. 4A and 4B when placed side by side illustrate partly in block form and partly schematically typical apparatus employed at each field station in accordance with one embodiment of this invention;

FIGS 5A and 5B when placed side by side illustrate various circuit details of the block diagrams illustrated in the field station apparatus of FIG. 4A;

Figure 1:
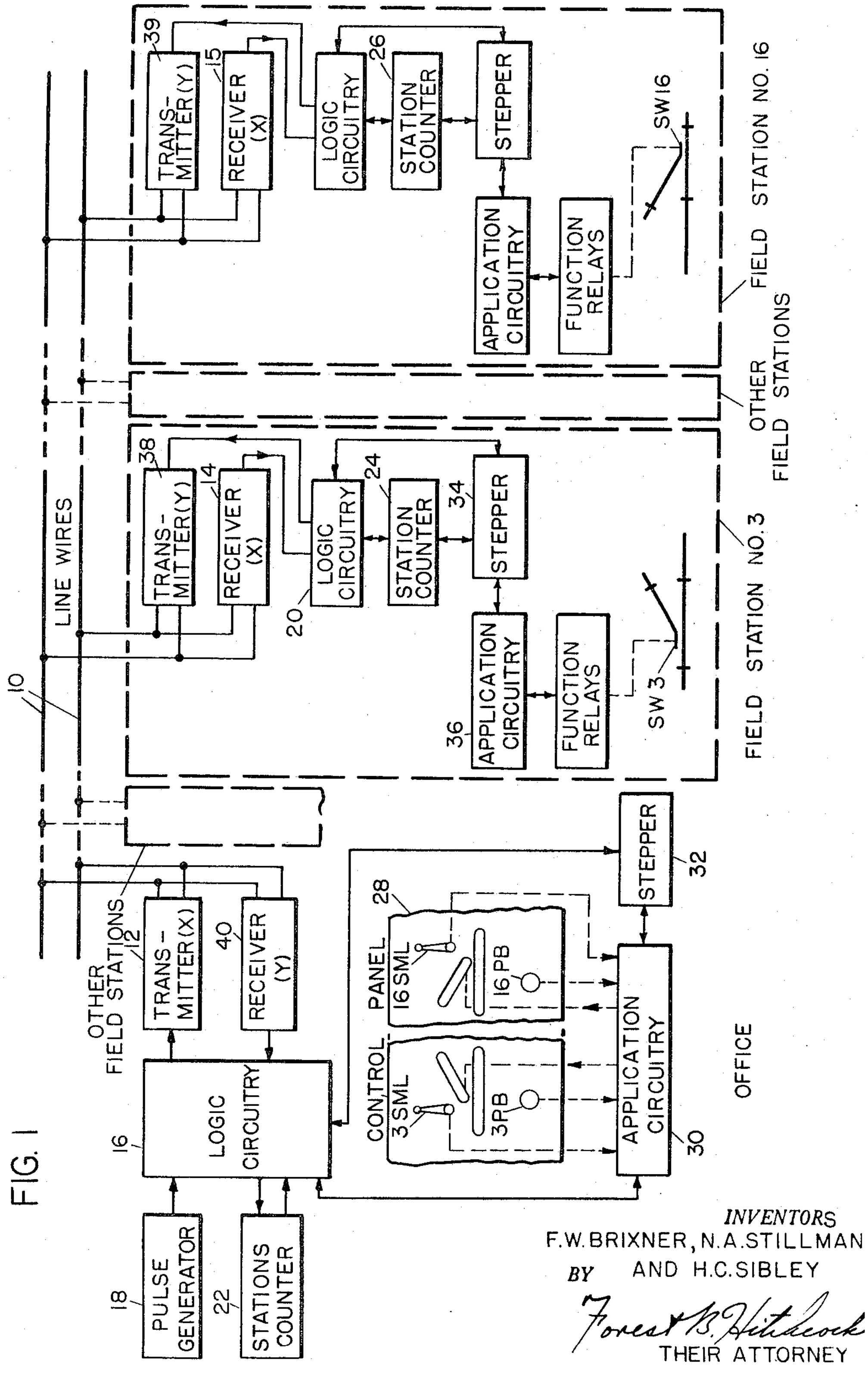

Generally speaking and without attempting to define the limits of the present invention, we have provided a code communication system wherein a control cycle is initiated only when it is desired to change the position of a device at a particular one of the field stations, and an indication cycle is intiated only when a change occurs at a particular field station. Other times no coded information is being transmitted over the line wires. However, a train of so called scanning pulses is communicated cylically between the central office and the plurality of field stations to permit each field station in turn to transmit an indication cycle. The system is so arranged that an indication cycle is initiated at the beginning and progresses during the transmission of a scanning pulse by causing a stored start at the particular field station to control central office apparatus such that the duration of the scanning pulse persists while the indication cycle is in progress; and upon completion of the indication cycle to permit the office to terminate this scanning pulse and resume sending subsequent scanning pulses. This prevents a conflict between field stations having simultaneously stored starts and permits each of the field stations to transmit in turn even if the transmitting station should have a start stored during its indication cycle. Further, according to the present invention the transmission of a control cycle interrupts the train of scanning pulses at any time during the scanning cycle, but only between scanning pulses, and because according to this embodiment, an indication cycle can be transmitted only during a scanning pulse, a control cycle and an indication cycle cannot be initiated simultaneously or while one or the other is in progress. Further, it is assured that a control cycle can be communicated immediately following the completion of an indication cycle even though there are other field stations ready to transmit an indication cycle.

In the illustrated embodiment of the invention, the apparatus for transmitting code elements are carrier transmitters capable of transmitting normally a carrier frequency of a predetermined value. Each carrier transmitter is capable of being operated to transmit selectively a frequency slightly higher or slightly lower than its normal carrier frequency. Transmitters of this type, are well known, and are commonly referred to as frequency shift transmitters. Thus, the series of code elements of this embodiment of the invention are trains of pulses which may be of either the normal or center frequency, higher frequency or the lower frequency.

The central office is provided with a frequency shift transmitter capable of transmitting a carrier frequency of a first predetermined value, and each field station is provided with a frequency shift transmitter capable of transmitting a carrier frequency of a second predetermined value distinct from said first carrier frequency. The central office is also provided with a carrier receiver capable of receiving and detecting the high and low frequencies of the carrier of the second predetermined value transmitted from the field stations; and each of the field stations is provided with a receiver capable of receiving and detecting the high and low frequencies of the first predetermined value transmitted from the central office.

Apparatus is so connected to cause the frequency shift transmitter at the central office to transmit a train of signals or pulses, which in this embodiment constitute a high frequency shift followed by a center frequency shift. The high frequency shifts of this train of pulses are counted by an electronic pulse counter at the central office and each of the field stations. The pulse counter at each field station is so connected that a distinctive output occurs upon the detection of a predetermined number of these high or scanning pulses, thus scanning each of the field stations in turn. At the central office, after a complete cycle constituting a predetermined number of these high or scanning signals has been transmitted, there is a momentary interruption in the transmission thereof. This causes all the counters at the field to first turn off and then reset to their predetermined condition in response to the first scanning signal of the cycle, to be sure they are synchronized.

In the illustrated embodiment of the present invention, the transmission and reception of the series of code elements referred to as a control cycle, and an indication cycle, is accomplished by the sequential operation of stepping relays at the sending and receiving locations. These stepping relays are operated by an associated normally inactive self-propelled time element device, which may be conveniently termed an oscillator. These oscillators are designed to measure like-time intervals, and when simultaneously initiated at a sending and receiving location, operate the stepping relays at these locations synchronously with the same effect, as if these stepping relays at the receiving station were operated over a line circuit in the manner characteristic of other types of systems. This manner of communicating operating cycles is characteristic of systems sometime known as "syncrostep" systems, and such a timing device is described in detail in U.S. Patent No. 2,907,980, to which reference is made for a more detailed description thereof.

In the illustrated embodiment of the invention, the series of code elements constituting the control cycle are low and high frequency shifts of the carrier frequency of the first predetermined value, which is also used to provide the scanning signals or pulses. The indication code elements are also a series of high and low frequency shifts, but of the carrier frequency of the second predetermined value. Upon the operation of a control lever at the central office, a momentary pulse of low frequency shift is transmitted following the center frequency, instead of the next high scanning pulse. The removal of the low frequency shift control start pulse causes the simultaneous, initiation of the oscillators at the central office and at each of the field stations. The start of the cycle causes the station counters to remain in the condition to which they were driven by the last scanning pulse. The central office then continues the transmission of the series of digits constituting the control codes as in the commonly known syncrostep system. Each control code cycle contains a first portion which addresses a particular field station, followed by a data portion that provides the information for operating the various devices at the addressed field station. At the completion of a control cycle, the oscillators are restored synchronously and the transmission of the discrete scanning pulses resumes.

When a field station wishes to transmit an indication cycle, which according to this embodiment of the invention, occurs when there has been a change in the condition of one of the devices associated with that field station, circuitry is so conditioned at that field station, that when its counter produces the aforementioned distinctive output after receiving a predetermined number of scanning pulses, the field station transmitter transmits, a momentary pulse of the second carrier frequency. This second carrier frequency pulse transmitted by a field station causes the apparatus at the central office to maintain transmission of that high shift scanning pulse which caused the transmitting field station to be activated until the end of the indication cycle. In other words, that scanning pulse transmitted from the central office which caused a particular field station to transmit a frequency shift pulse of the second frequency, persists for the duration of the indication cycle. The removal of the momentary low shift transmitted by the field carrier causes the release of the oscillators at the respective field stations and at the central office to cause all of the oscillators to operate in synchronism during the indication cycle. The first portion of the indication code cycle identifies the field station from which the indication code is being transmitted, and the second portion of the indication cycle transmits indications to the central office for that particular field station depending upon the condition of the apparatus associated therewith. At the end of the indication cycle the oscillators at the transmitting field location and the central office are restored or latched up practically simultaneously. The restoration of the oscillator at the transmitting field location causes the transmission of the frequency shift pulses of the second carrier frequency to stop, thereby causing the central office to terminate the transmission of that high shift scanning pulse which persisted during the indication cycle, and to resume the transmission of subsequent scanning pulses, which are effectively counted by the counters at each of the field locations and the central office as hereinbefore described.

Although the general features of a code communication system according to the present invention are useful in a variety of different applications where it is necessary to communicate information between a central office and one or more remote field stations, the illustrated embodiment of the invention is particularly adapted for use in centralized traffic control system for railroads where a central office transmits information to control railway switches, and other signaling devices at a plurality of remote field stations, and the condition of these devices, as well as the conditions of devices for registering track occupancy associated with the particular section of railroad is transmitted to the central office.

For the purpose of simplifying the illustration and facilitating the explanation, the various parts and circuits constituting the embodiments of the invention have been shown diagrammatically and certain conventional illustrations have been employed. The drawings have been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of a battery, or other sources of electric current, instead of showing all of the wiring connections to these terminals.

Refering in detail to the drawings, particularly FIG. 1, apparatus at a central office and at a plurality of field stations, such as field station No. 3 and field station No. 16, which are shown in block form, are connected for communication by a line circuit referred to at 10. The central office is provided with a frequency shift carrier transmitter 12, which is capable of being operated to transmit over the line wires 10, a basic carrier frequency, hereinafter referred to as frequency X, which frequency may be shifted as hereinbefore mentioned. The information transmitted by the transmitter 12 is characterized by a train of pulses that may be either the basic or center frequency X, or a frequency slightly higher or lower than the center frequency X. In each of the field stations there is provided a carrier receiver such as is refered to at 14 for field station No. 3 and 15 for field station No. 16 which is capable of responding to and detecting the center, high and low frequency shifts of the carrier frequency X.

The output of the transmitter 12 is controlled by logic circuitry 16 for causing the transmitter 12 to either produce a pulse train which, in effect, scans successively the several field stations, or to produce a pulse train which corresponds to a control code cycle. A conventional pulse generator 18, through the logic circuitry 16, causes the output of the transmitter 12 to periodically shift to its slightly higher frequency at a predetermined rate, such as ten times per second, for example, thereby producing a series of high shift pulses of frequency X which are of a predetermined duration and occur at a predetermined repetition rate. These pulses are received by each of the carrier receivers, such as the receiver 14, for example, and by the logic circuitry 20, for field station No. 3. These so-called high shift or scanning pulses of the carrier frequency X are counted at the central office by a station counter 22, and at each of the field stations by a station counter, such as counter 24, for field station No. 3 and 26 for station No. 16. After a cycle of these scanning pulses have been transmitted, the station counter 22 at the central office is reset, and after a short delay or interruption, another scanning cycle is transmitted. During the delay which occurs periodically after a predetermined count or cycle of the scanning pulses, each of the station counters, such as 24 and 26 is reset to its original predetermined condition to commence counting scanning pulses so that the station counters are all reset and synchronized to condition them for counting the scanning pulses of the next cycle.

Each of the station counters, such as counter 24, for field station No. 3 and counter 26 for field station No. 16, for example, is predetermined to produce an output after counting a different predetermined number of the high shift scanning pulses of the carrier frequency X. For example, the station counter 24 may be adapted to produce an output upon the reception of the fourth scanning pulse after the synchronizing period, and the station counter 26 for the field station No. 16, may be adapted to produce an output upon the reception of the seventeenth scanning pulse after the synchronizing period. The first scanning pulse is used to reset each of the counters.

The central office is also provided with a conventional control panel 28 upon which are mounted various levers for controlling the devices at respective field stations. For example, a lever 3SML is operated to control switch SW3 to either a normal or a reverse position for field station No. 3. A lever 16SML is provided to control the switch SW16 to either a normal or a reverse position for the field station No. 16. The commencement of a control code cycle for effecting the movement of the devices at a particular field station is caused by the operation of a push button, such as 3PB for field station No. 3, or 16PB for field station No. 16 for example.

Upon the operation of the push button 3PB, for example, the logic circuitry 16 prevents the pulse generator 18 from operating the transmitter 12 to produce any subsequent scanning pulses, and holds the stations counter 22 in the count position that it has assumed upon the transmission of the previous scanning pulse. Instead of the next scanning pulse, a low shift pulse is transmitted by the transmitter 12, which causes the receivers at each of the field stations, such as 14, to respond by causing the respective station counters, such as 24 and 26 to hold the scanning count caused by the preceding high scanning pulse. This same low frequency shift pulse of the carrier frequency X causes the apparatus at the central office which includes application circuitry generally referred to at 30 and the stepper unit 32 to affect the logic circuitry 16 so as to commence the transmission of a control cycle. Similarly, this low frequency shift pulse of the carrier frequency X causes the apparatus at each of the field stations which includes the stepping unit referred to at 34 and the application circuitry referred to at 36, for field station No. 3 for example, to be conditioned for the reception of a control code cycle. The logic circuitry 16 causes the transmitter 12 to send a series of pulses which are either high shift or low shift pulses of the carrier frequency X depending on the code to be transmitted. These pulses are transmitted at a rate determined by the stepper unit 32.

Each of the field stations, is provided with a frequency shift transmitter, such as is referred to at 38 for field station No. 3 and at 39 for station No. 16 which is capable of transmitting frequency shifts of a carrier frequency hereinafter referred to as carrier frequency Y. A carrier receiver 40 is located at the central office and is capable of detecting the high and low frequency shifts of the carrier frequency Y. The transmitters, such as 38 and 39, are only able to commence transmission when its respective station counter 24 and 26 has an output. Thus, if a field station, such as No. 3, for example, desires to send an indication code; upon the reception of the fourth scanning pulse, the transmitter 38 transmits a frequency shift which is received and detected by the receiver 40 at the central office. The reception of this pulse of the carrier frequency Y causes the transmitter 12 to continue the transmission of the high frequency scanning pulse which caused the transmitter 38 to transmit its pulse of this carrier frequency Y. This causes the station counter, such as 24 and 26 at each of the field stations to remain in the count condition caused by the reception of the fourth high shift pulse. Simultaneously, the apparatus at the transmitting field station and at the central office is released in synchronism to demarcate the steps or digits of an indication code cycle. The indication code cycle is a series of high and low frequency shifts of the carrier frequency Y. The rate of these pulses, which constitute the indication code cycle is determined by the stepper units 34 and 32 respectively. At the end of an indication code cycle transmitted from station No. 3, the transmitter 38 stops transmitting, the fourth scanning pulse is terminated at the central office, and the transmitter 12 commences transmitting subsequent scanning pulses.

*Scanning organization*

Figure 2A:
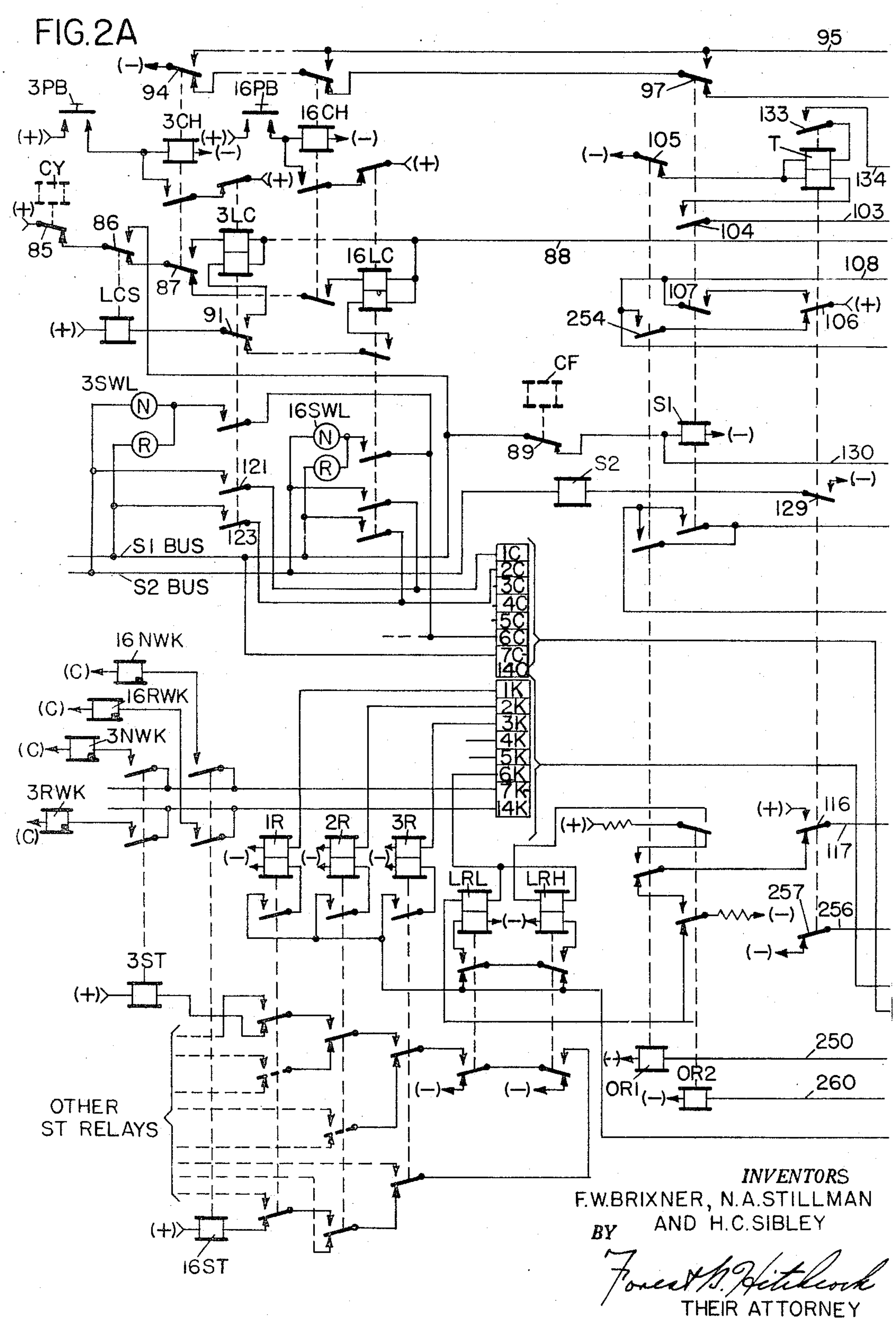
Figures 2B, 3:
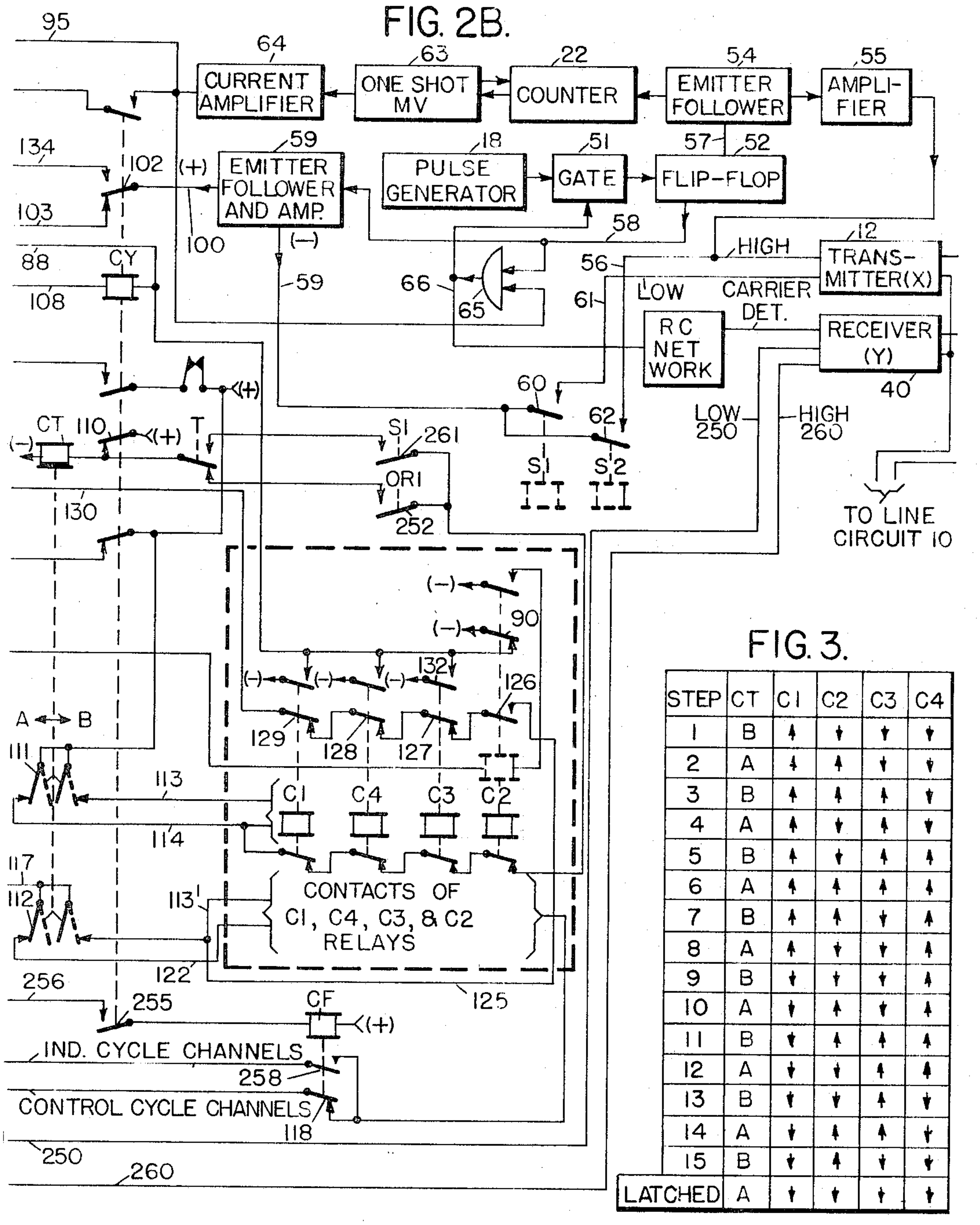
Figure 6:
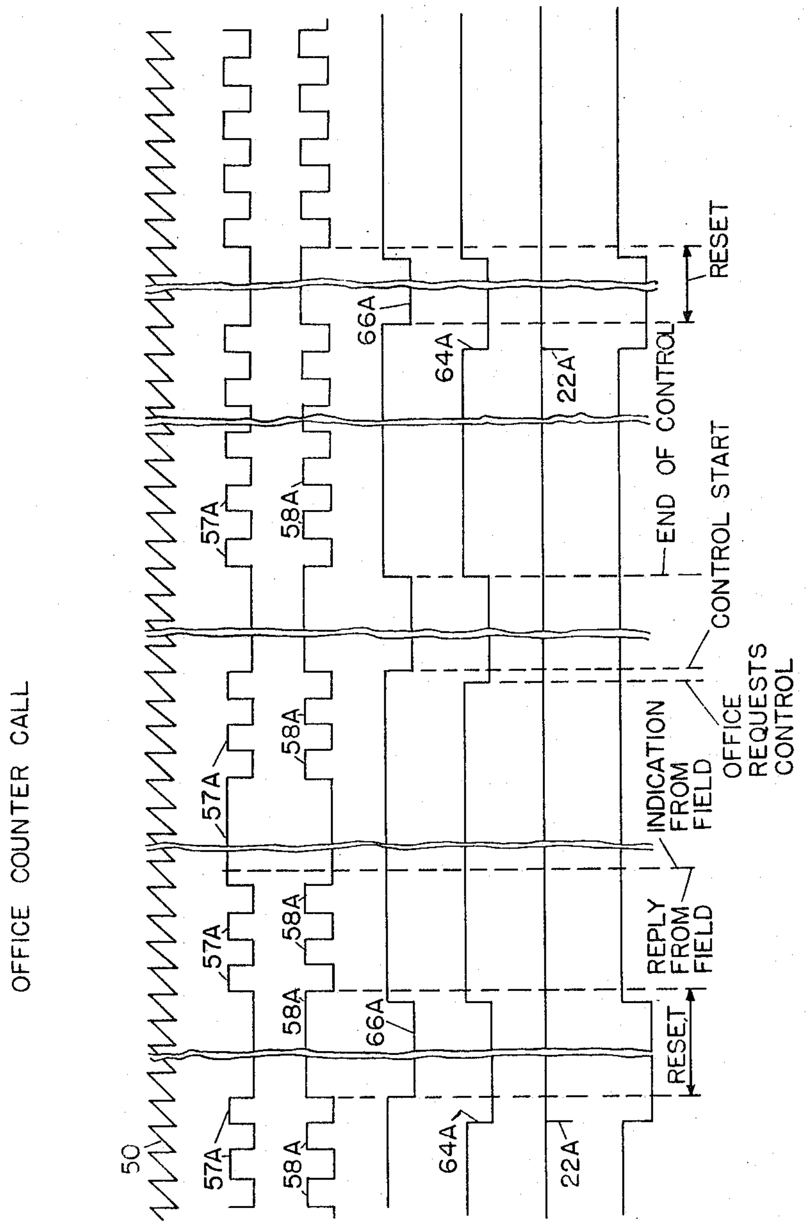
FIG. 6 illustrates the various waveforms occurring in certain portions of the apparatus in the central office under various operating conditions of the system.

Referring to FIG. 2B, and the waveforms of FIG. 6 the pulse generator 18, which may be a conventional oscillator, such as a unijunction transistor sawtooth generator, for example, provides an output corresponding to the waveform referred to at 50 of FIG. 6. These pulses are fed through an OR gate 51 to the input of a conventional binary flip-flop circuit 52. The flip-flop circuit 52 generates square waves on its output wire 57 as illustrated by waveforms 57A of FIG. 6. The output wire 57 from the flip-flop circuit 52 is connected to the input of a conventional emitter follower circuit 54 and an amplifier 55. The output of the amplifier 55 is connected with a wire 56 to the high shift of the transmitter 12. Thus, each output pulse on wire 57 of the flip-flop circuit 52 causes the transmitter 12 to transmit a high shift pulse of the carrier frequency X. Another output wire 58 from the flip-flop circuit 52 is connected to the input of an emitter follower and amplifier circuit 59. As illustrated by waveforms 58A of FIG. 6 the output pulse on wire 58 occur between the pulses on output wire 57. Thus, the circuit 52 provides output pulses on wire 57 and 58 alternately. The output 59' of the amplifier 59 is connected through a front contact 60 of a relay S1 to a wire 61 which when energized by amplified pulses from amplifier 59 causes the transmission of a low shift pulse of the carrier frequency X only when the relay S1 is energized. The ouput on wire 59' of the amplifier circuit 59 is also connected through a front contact 62 of a relay S2 to the wire 56 for causing the transmission of a high shift pulse of the carrier frequency X when the relay S2 is energized. When neither wire 56 or wire 61 is energized, a center frequency is transmitted by the transmitter 12. The operation of the relays S1 and S2 will be described hereinafter.

The station counter 22 at the control office, which may be a conventional well-known ring type counter using silicon controlled rectifiers is also connected to the output of the emitter follower circuit 54 to count the pulses which occur on the output wire 57 of the flip-flop circuit 52. After the counter 22 has operated in response to a predetermined number of these pulses 57A, it produces a distinctive output which turns "on" a conventional one-shot multivibrator 63. This distinctive output may be a negative spike from a differentiator as represented by waveform 22A. The output of the one-shot multivibrator 63 is connected to a conventional current amplifier 64, which provides energy to one input of an AND gate 65 for a period of time as controlled by the one-shot multivibrator 63 as represented by waveform 64A of FIG. 6. Upon the termination of the scanning pulse which operated the multivibrator 63 output wire 58 of the flip-flop circuit 52 is energized (see 58A). When the output on wire 58 occurs, both of the inputs to the AND gate 65 are energized and an effective output occurs on wire 66, which is represented by waveform 66A of FIG. 6. The output 66A from AND gate 65 by way of wire 66 operates the gate 51 to the flip-flop circuit 52 to produce a pulse 57A. When the multivibrator 63 turns off by virtue of its own time constant, the output from the amplifier 64 ceases and gate 65 stops conducting. Thus, the gate 51 permits the flip-flop circuit 52 to be operated and the transmitter 12 transmits a first high shift scanning pulse of the scanning cycle and the counter 22 is operated as previously described. As will be described hereinafter, this resetting or synchonizing period permits each of the counters such as 24 and 26 at the field stations to reset and synchronize.

Figure 4A:
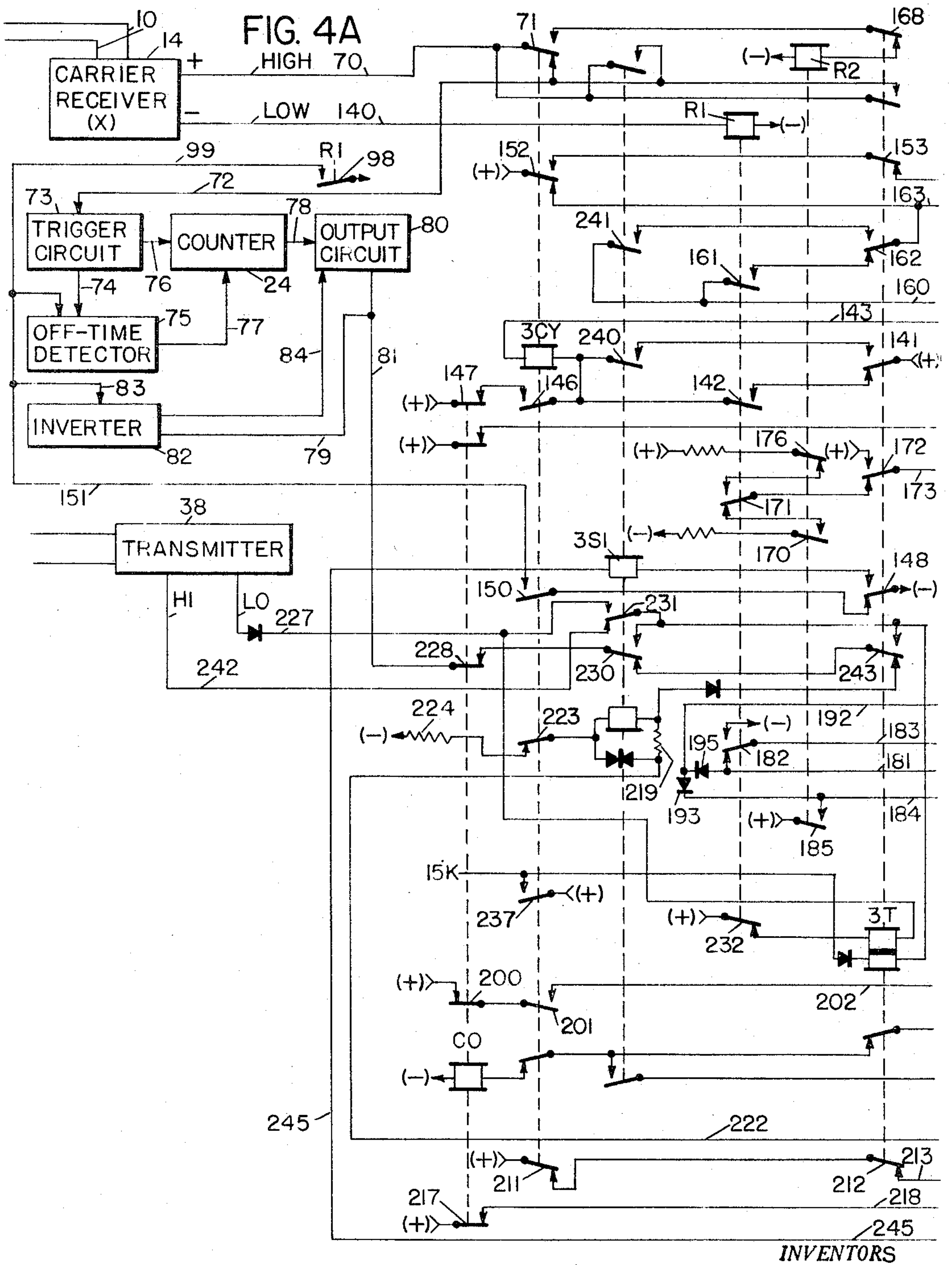
Figure 7:
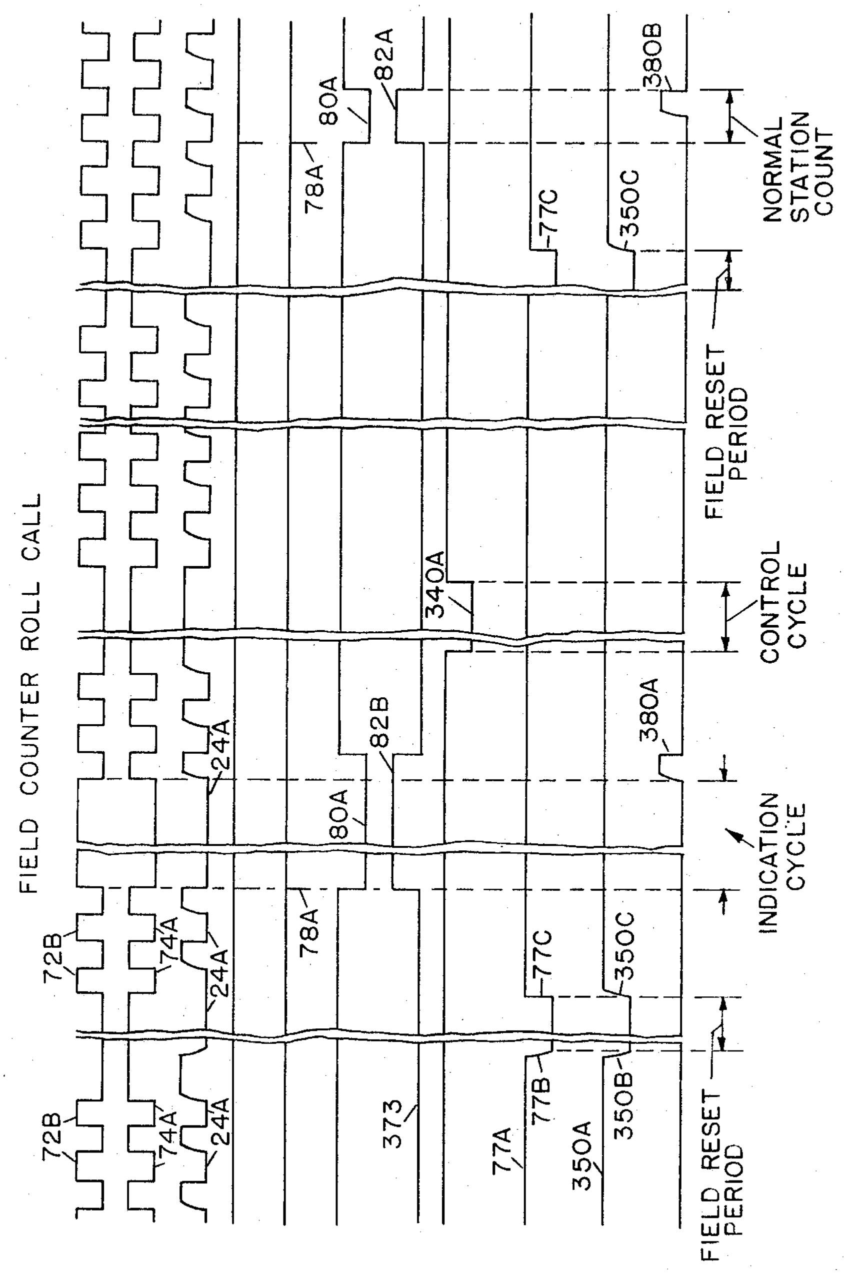
FIG. 7 illustrates waveforms occurring in certain apparatus located at a typical field station during various operating conditions of the system.

Referring to FIG. 4A and the waveforms of FIG. 7, the scanning pulses from the transmitter 12 are received at the field station No. 3 by the carrier receiver 14 and at other field stations by similarly connected carrier receivers. Upon the detection by the receiver 14 of each high frequency scanning pulse on the line circuit 10, a positive output occurs on a wire 70 which is connected through a back contact 71 of the relay 3CY, the operation of which will be described hereinafter, to input wire 72 of a conventional Schmitt trigger circuit 73. The input pulses from wire 70 to the input 72 of the trigger circuit are represented by pulses 72B of FIG. 7. The trigger circuit 73 provides a characteristic negative output on wire 74 in response thereto, which is presented by pulses 74A of FIG. 7. The negative pulses 74A provide the input to an off time detector 75 which, in response thereto at a predetermined repetition rate, prevents the counter 24 from resetting to its predetermined condition by way of output wire 77. The trigger circuit 73 also drives the counter 24 over output wire 76. The driving pulses to the counter 24 are represented by pulses 24A of FIG. 7. The scanning pulses drive the counter 24 and when no pulses are detected between scanning cycles, the counter 24 is caused to be reset to a predetermined condition upon the reception of the first scanning pulse of the next scanning cycle, which is described in more detail in connection with FIG. 5A and 5B.

When the counter 24 has been operated in response to a predetermined number of pulses 24A, a distinctive output occurs on wire 78, which may be a differentiated negative spike as represented by 78A of FIG. 7. In response to the negative spike 78A, an output bistable trigger circuit 80 is turned "on" to energize wire 81 with negative potential as represented by waveform 80A of FIG. 7. Wire 79 to the input of an inverter circuit 82 is also energized. With the inverter circuit turned "on" by energy on wire 79, the next pulse on output wire 74 will shut "off" the inverter 82 by way of wire 83, which in turn shuts "off" the output bistable circuit 80 over wire 84 to terminate the scan period for the field station. The scan period when no indication cycle is to be transmitted is represented by waveform 82A and during an indication cycle by waveform 82B of FIG. 7, corresponds to the "on" period of the inverter 82 and bistable circuit 80.

*Control cycle*

Figure 8:
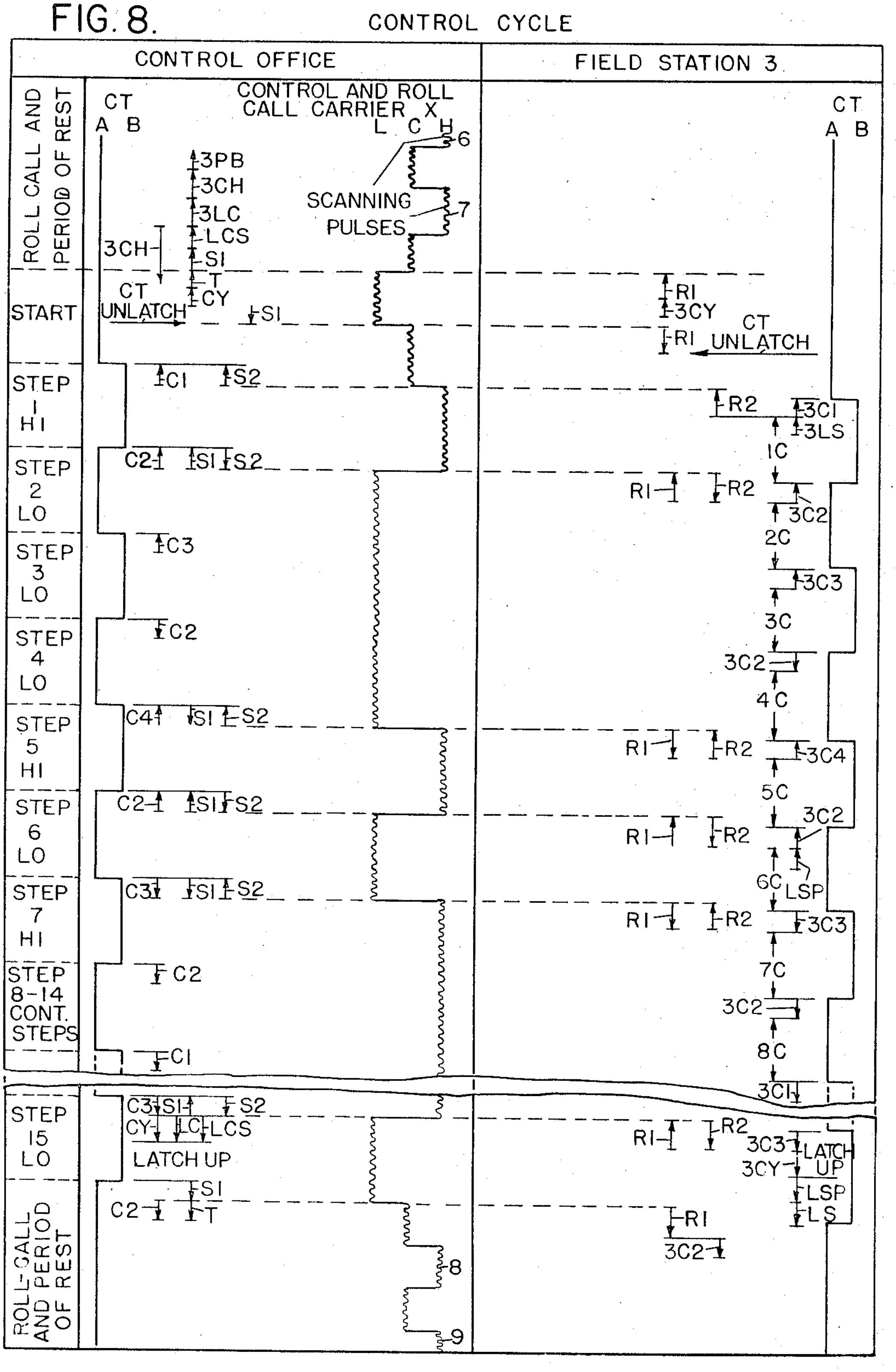
FIG. 8 is a sequence chart showing the operation of various elements of the system at the central office and one of the field stations during a control code cycle.

Referring to FIGS. 2A and 2B, and the sequence chart of FIG. 8 and assuming that an operator at the central office wishes to send a control cycle to field station No. 3 to operate the switch 3SW to reverse, for example, he operates the lever 3SWL to a position to provide energy through the symbol designated as R (FIG. 2A) and then operates push button 3PB, which energizes relay 3CH. Upon the picking up of the relay 3CH, a relay 3LC is picked up by a circuit which extends from (+) and includes back contact 85 of relay CY, back contact 86 of relay LCS, front contact 87 of relay 3CH, the winding of the relay 3LC, wire 88, and back contact 90 of a stepping relay C2. Upon the picking up of the relay 3LC, the relay LCS is picked up through front contact 91 of the relay 3LC. Upon the picking up of the relay LCS its front contact 86 closes, which supplies positive energy to either energize or deenergize certain ones of the terminals referred at 1C through 14C in accordance with the address of the field location, and the particular code to be transmitted during the control cycle.

The picking up of the relay LCS also causes the picking up of relay S1 upon the closing of its front contact 86 by an obvious circuit which includes back contact 89 of relay CF. The picking up of the relay S1 causes its front contact 60 (FIG. 2B) to close which supplies energy to the wire 61 from output wire 59′ of the amplifier circuit 59 when an output occurs on wire 58 of flip-flop circuit 52, for causing the transmitter 12 to transmit low shift pulses. With the relay 3CH picked up, one of the inputs to the AND gate 65 is provided with energy from a circuit which includes front contact 94 of the relay 3CH, and the wire 95. Therefore, when an output occurs on the wire 58 from the flip-flop circuit 52 after the transmission of a scanning pulse, the AND gate 65 is effective by way of wire 66 and gate 51 to prevent the generator 18 from operating the flip-flop circuit 52 to its opposite condition thereby preventing transmission of the next scanning pulse. The picking up of the relay S1 following the picking up of the relay 3CH causes a low shift pulse to be transmitted and also closes its front contact 97 to maintain wire 95 energized when the relay 3CH drops away upon the picking up of the relay 3LC.

Upon the picking up of the relay S1, transmit relay T is energized by a circuit which extends from (+) on output wire 100 of the emitter follower and amplifier circuit 59 and includes back contact 102 of the relay CY, wire 103, front contact 104 of the relay S1, the winding of the relay T and back contact 105 of relay OR1 to (−). Upon the picking up of the relay T, the relay CY is picked up by a circuit which extends from (+) which includes front contact 106 of the relay T, front contact 107 of the relay S1, wire 108, the winding of relay CY and the back contact 90 of the stepping relay C2 to (−). Upon the picking up of the relay CY, the relay S1 is deenergized. The relay S1 is dropped away by the opening of back contact 85 of the relay CY (FIG. 2A) in the pick up circuit for the relay S1. The oscillator CT is released or deenergized by the opening of back contact 110 of relay CY (FIG. 2B) in its holding circuit. The dropping away of the relay S1 also opens it front contact 60 thus removing energy from input wire 61 of the transmitter 12 to stop the transmission of the low shift pulse and start sending a center frequency of the carrier X. The oscillator CT, may be of the conventional type such as is shown and described in the U.S. Patent No. 2,907,-980, and operates so that it freely swings to open and close its contacts referred to at 111 and 112 in FIG. 2B. When the aforementioned contacts of the oscillator CT are in their left-hand position, as shown in the drawings, the oscillator CT is said to be in postion A and when the contacts are in their right-hand position, as shown in the drawings, the oscillator CT is said to be in position B. Thus, after the oscillator CT is released in response to the releasing of the S1, the contacts 111 and 112 swing from A to B to define the first step of the cycle and from B to A position to define the second step and so on until the completion of the code cycles.

The contacts 111 of the oscillator CT sequentially energize stepping relays C1, C4, C3 and C2 over wires 113 and 114 in a well known manner as described in the aforesaid patent. With reference to FIG. 3 the aforesaid stepping relays are in their picked up and dropped away positions during each step of the cycle or oscillation of the oscillator as represented by the direction of the arrows in FIG. 3. The contact 112 of the oscillator CT provides a path through the various contacts of the stepping relays C1–C4 to energize in succession the control channels referred to at 1C through 14C (FIG. 2A). These control channels are connected in a well-known manner through front contacts of the relay 3LC to energize selectively during each step of the control cycle, the wire referred to as S1 bus and S2 bus for picking up the S1 or the S2 relay, respectively. The first part of the control cycle picks up the S1 or the S2 relays in a predetermined sequence in accordance with the address code of the field station that is to receive the control cycle. For example, the steps 1 through 5 can be used to select an address code and the remaining steps 6 through 14 may be used to provide functions for the various devices at the particular addressed field station.

With reference to the present example, upon the beginning of the first step of the control cycle the S2 bus is energized to pick up the relay S2 by a circuit which extends from (+) and includes front contact 116 of the relay T, wire 117, contact 112 of the oscillator CT in its B position, wire 113′, the respective front and back contacts of the stepping relays C1 through C4 as illustrated in FIG. 3 herein, back contact 118 of the relay CF, terminal 1C (FIG. 2A), front contact 121 of the relay 3LC, the S2 bus, the winding of the relay S2 and front contact 124 to (−). The picking up of the S2 relay closes its front contact 62 and the transmitter 12 sends a high shift pulse as previously described.

For the second step of the control cycle, the contact 112 of the oscillator CT moves to its A position and the terminal C2 is energized as previously described over a wire 122 leading to the contacts of the stepping relays C1 through C4. At the beginning of this second step of the control cycle, the relay S2 is dropped away when energy is removed from terminal 1C and relay S1 is picked up by a circuit which includes front contact 123 of the relay 3LC, the S1 bus, the back contact 89 of the relay CF and the winding of the relay S1. The picking up of the relay S1 causes its front contact 60 (FIG. 2B) to close to energize the wire 61 for causing the transmitter 12 to send a low shift pulse.

This communication of the control cycle continues in accordance with the code to be transmitted through step No. fourteen with the transmitter transmitting either a high or a low shift pulse of the carrier frequency X, as illustrated in FIG. 8. Step 15 of the cycle is reserved to pick up the relay S1, if it is not already picked up in step fourteen, and to drop out the relay S2, to cause the transmission of a low frequency pulse of the carrier frequency X. In this fifteenth step, the relay C3 drops away so that the stepping relays C1 through C4 assume the position as shown in the chart of FIG. 3. When the oscillator moves to its B position, it causes the picking up of the relay S1 by a circuit which extends from (+) and includes front contact 116 of the relay T, wire 117, the contact 112 of the oscillator CT in its B position, a wire 125, front contact 126 of relay C2, back contact 127 of relay C3, back contact 128 of relay C4, back contact 129 of relay C1, wire 130, and the winding of the relay S1 to (−). The relay 3LC and the relay LCS are deenergized in the fifteenth step of the code cycle by the opening of front contact 132 of the stepping relay C3 in its holding circuit. The relay CY also drops away upon the opening of the front contact 132 of the relay C3. The shifting of the contact 102 of relay CY from front to back opens the stick circuit for relay T which includes its front contact 133 and wire 134 but the relay T is still held energized through its previously described pick-up circuit. In the response to the dropping away of the relay CY, its back contact 110 also closes thereby energizing or latching up the oscillator CT. When it latches up, its contact 112 is in the A position whereby the pick up circuit for the relay S1 is open and it drops away to open its front contact 60 to terminate the transmission of the low frequency pulse.

With the oscillator CT latched up, and its contacts in the A position, the relay C2 of the stepping relay drops away so that all of the stepping relays C1–C4 are now in the deenergized position. In response to the dropping away of the relay S1, the relay T is caused to drop away by the opening of the front contact 104 in the pick up circuit of the relay T. With both the relays S1 and S2 dropped away, the transmitter 12 transmits a center shift frequency. The dropping away of the relay S1 with the relay CY deenergized removes negative energy from the wire 95 connected to the input of the AND gate 65. The removing of this energy from the AND gate 65, removes energy from the wire 66 connected to the input of the gate 51 thereby permitting the pulse generator 18 to operate the flip-flop circuit 52 to its position to cause the transmission of a scanning pulse by activating the wire 56 through the emitter follower 54 and the amplifier 55. Also, the counter 22 is driven as previously mentioned. The operation of the flip-flop circuit 52 to this condition also removes energy from the emitter follower amplifier 59 which supplied the energy to the pick-up circuit for relay T.

Figure 4B:
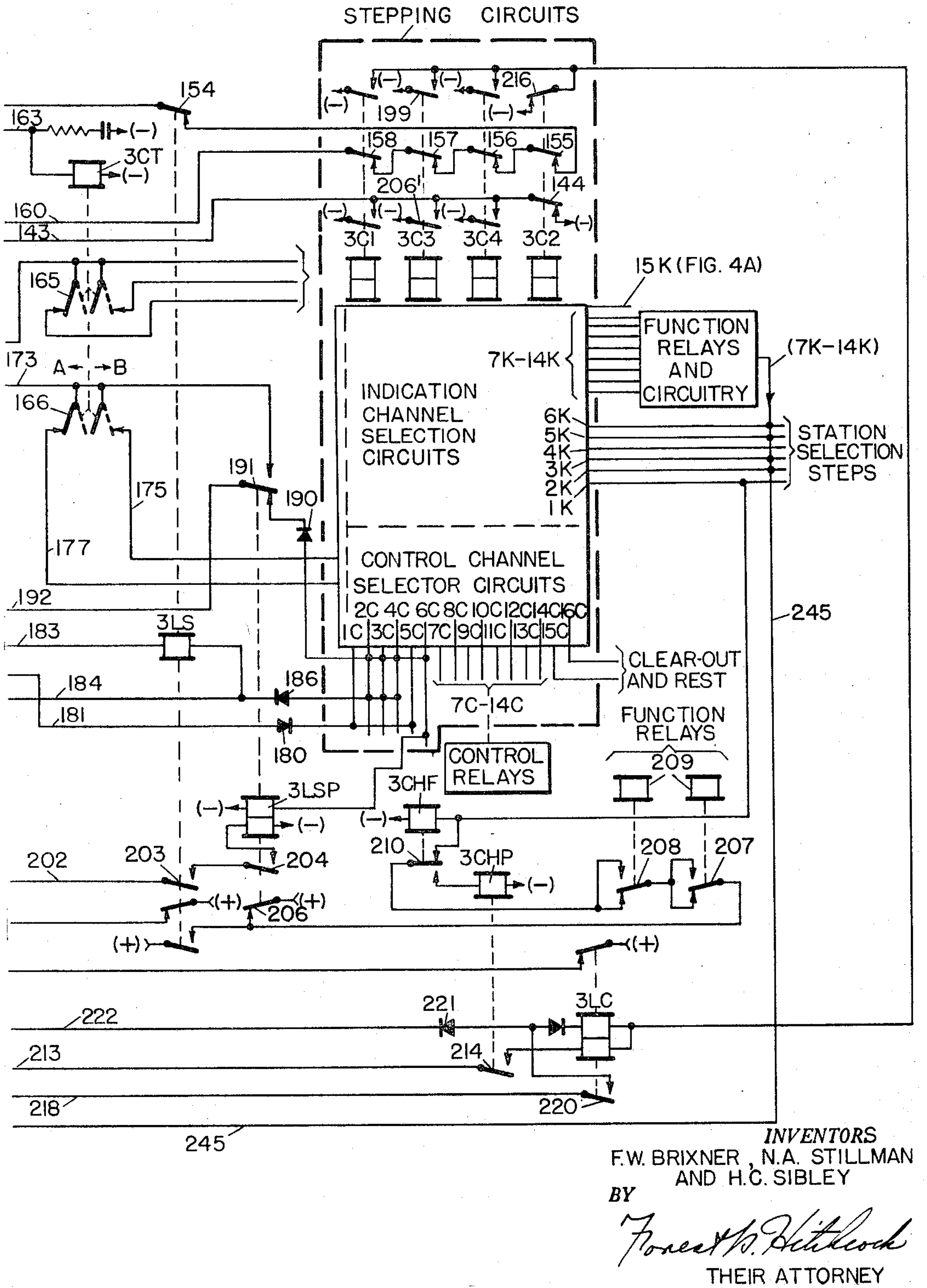

With reference to FIGS. 4A and 4B, and the sequence chart of FIG. 8 the field station apparatus will now be described as it relates to reception of a control code transmitted from the central office.

The reception of the first low frequency pulse which was initiated by the picking up of the relay S1 at the central office as previously described, causes the carrier receiver 14 to produce an output on wire 140 to energize a receive relay R1. The picking up of this relay provides negative energy to the off time detector 75 front contact 98 of the R1 relay and the wire 99 which is connected to off-time detector 75. This negative energy prevents the off time detector 75 from initiating a reset period at the absence of the high shift scanning pulses during a control cycle. The picking up of the relay R1 causes the relay 3CY to pick up by a circuit which extends from (+) and includes back contact 141 of relay 3T, front contact 142 of relay R1, the winding of the relay 3CY, wire 143, and back contact 144 of the stepping relay 3C2 to (−). The relay 3CY is stuck up through its front contact 146 and front contact 147 of a conventional clearout relay CO which is a timing relay that remains energized in a well-known manner during normal operation of the system. When the first low frequency pulse ceases, the input to the off-time detector 75 is provided over a circuit which extends from (−) and includes back contact 148 of the relay 3T, front contact 150 of the relay 3CY and wire 151 to prevent the counter 24 from resetting in the absence of scanning pulses during the reception of a control cycle. Prior to the picking up of the relay 3CY the oscillator CT is normally held energized or in its latched position through the back contact 152 of the relay 3CY, the wire 163 and the winding of the oscillator 3CT to (−). The oscillator 3CT is held latched up or energized with the relay CY picked up by a circuit which extends from (+) and includes front contact 152 of the relay 3CY, back contact 153 of the relay 3T, back contact 154 of the location selection relay 3LS, back contacts 155, 156, 157, and 158 of the stepping relay C2, C4, C3 and C1 respectively, wire 160, front contact 161 of the relay R1, back contact 162 of the relay 3T, wire 163, and the winding of the oscillators 3CT to (−).

When the reception of the first low frequency pulse ceases, the R1 relay is deenergized and the opening of its front contact 161 in the previously described energizing circuit for the oscillator 3CT causes the oscillator 3CT to become deenergized and release.

Thus, the picking up of the relay S1 at the central office at the beginning of a control cycle causes each of the field stations to pick up their R1 relays in response to the reception of the low frequency pulse and the coding apparatus at each of the field stations is conditioned to receive a code cycle. When the relay S1 at the central office releases to terminate the transmission of the first low frequency pulse, the termination thereof which releases the relay R1 causes the simultaneous unlatching of the oscillators at each of the field stations as previously described. Thus, the oscillator CT at the central office and the oscillators at the field stations, such as oscillator 3CT, are released to operate in synchronism for the transmission and reception of a control cycle.

The stepping relays such as 3C1 through 3C4 for field station No. 3 and at each of the other field stations are similar to the stepping relays described in connection with the central office equipment and contacts 165 and 166 of the oscillator 3CT are normally in position A when the oscillator is energized or latched up, and upon releasing they move to position B and back to A periodically as hereinbefore described in connection with the central office equipment. As previously mentioned, the first part of the control code cycle is concerned with the address of that field station which is to thereafter receive effectively the data portions of control cycle. Thus, assuming that the control code cycle previously described is meant for field station No. 3 as shown in FIGS. 4A and 4B, the first step in the cycle is a high frequency pulse which causes the receiver relay R2 to be picked up from the output of the carrier receiver 14 over the wire 70, the front contact 71 of the relay 3CY, the back contact 168 of the relay 3T and the winding of the relay R2 to (−). The picking up of the relay R2 completes a circuit which extends from (−) and includes front contact 170 of the relay R2, back contact 171 of the relay R1, back contact 172 of the relay 3T, wire 173, contacts 166 of the oscillator 3CT in position B, wire 175, and the various contacts of the stepping relays in accordance with their position as shown in FIG. 3, as previously mentioned, to select channel circuit 1C for providing an output in accordance with the energy flowing through the previously described circuit. During the first step of the control cycle in response to the picking up of the relay R2 upon the reception of a high frequency code element, the output wire from 1C is negative and the relay 3LS is energized by a circuit which extends from the wire 1C and includes diode 180, wire 181, back contact 182 of relay R1, wire 183, the upper winding of the relay 3LS, wire 184, and front contact 185 of the relay R2 to (+). In the second step of the control cycle a low shift pulse is received thereby causing the relay R1 to pick up and the relay R2 to drop away; and in response to the picking up of the relay R1, a circuit is completed which extends from (+) and includes back contact 176 of the relay R2, front contact 171 of the relay R1, back contact 172 of the relay 3T, wire 173, the contact 166 of the oscillator CT in its A position and wire 177 leading to the control channel selectors circuits for providing a positive output on the terminal 2C. On each succeeding code element of the address portion of the cycle, which in this embodiment is six steps, for example, the output on the selector circuits 2C through 5C respectively are either a (+) or a (−) in accordance with the code received. The relay 3LS is always picked up in accordance with the present embodiment in response to the first step of the cycle, as connections are made to pick up this relay regardless of the polarity of energy on the selector 1C. For example, if the first step of the cycle is a low frequency element, the relay 3LS is picked up by a circuit which includes diode 186, the winding of the relay 3LS, the wire 183, and the front contact 182 of the relay R1 to (−). If each code element received in subsequent steps of the address portion of the control cycle is not in agreement with the connection made at the field station, the relay LS for the particular field station will drop away and the field station is rejected. If the relay LS for a particular field station remains energized until the sixth step of the cycle, for example, the relay 3LSP causes the relay 3LS to remain energized during the remainder of the control cycle.

In the present example, the second step of the control cycle is a low frequency code element to apply positive energy on the selector terminal 2C which provides a stick circuit for the relay 3LS that includes diode 186, the winding of the relay 3LS, wire 183, and the front contact 182 of the relay R1 to (−). If in this step, the code element has been a high frequency, the relay 3LS would have dropped away because of disagreement with the particular connections at the field station. Assuming that the field station No. 3 is the one that is addressed, in step No. 6 of the code cycle, the selector terminal 6C is energized by positive energy which sticks the relay 3LS that includes diode 190, back contact 191 of the relay 3LSP, wire 192, diode 193, the wire 184, the winding of relay 3LS, wire 183, and the front contact 182 of the relay R1 to (−) and the relay 3LSP is picked up by an obvious circuit (FIG. 4B). Upon picking up of the relay 3LSP, the relay 3LS is held energized in subsequent steps for low shift codes elements by a stick circuit which extends from (+) and including back contact 176 of relay R2, front contact 171 of relay R1, back contact 172 of relay T, wire 173, front contact 191 of relay LSP, wire 192, diode 193, wire 184, winding of 3LS, wire 183, front contact 182 of relay R1 to (−). For a high shift code element, the stick circuit extends from (+) and includes front contact 185 of relay R2, wire 184, upper winding of relay 3LS, wire 183, back contact 182 of relay R1, diode 195, wire 192, front contact 191 of relay 3LSP, back contact 172 of relay 3T, back contact 171 of relay R1, front contact 170 of relay R2 to (−). In the event that neither the R1 nor R2 relays is picked up in any step after the 3LSP is picked up, the relay 3LS will release and prevent further delivering of controls. The relay 3LSP is held energized by a stick circuit which extends from (+) and includes front contact 200 of the relay CO, front contact 201 of the relay 3CY, wire 202, front contact 203 of the relay 3LS, front contact 204 of the relay 3LSP, and the lower winding of the relay 3LSP to (−).

The remaining steps of the cycle may be either high or low shift code elements in accordance with the controls transmitted to operate conventional control relays as shown in block diagram in FIG. 4B. In step No. fifteen of the control cycle, which in this embodiment of the invention is assumed to be a low frequency code element, the position of the stepping relays are as illustrated in FIG. 3 and the contacts of the oscillator 3CT are in their B position. Upon the dropping away of the stepping relay C3, the stick circuit for the relay 3CY is interrupted by the opening of front contact 206′ of the relay 3C3 and the relay 3CY drops away. The dropping away of the relay 3CY causes its back contact 152 to close which energizes the winding of the oscillator 3CT to restore it to its normally at rest or latched up position. The dropping away of the relay 3CY also opens the previously described stick circuit for the relay 3LSP at front contact 201, which in turn opens the stick circuit for the relay 3LS, at front contact 191 of the relay 3LSP. At the completion of step No. fifteen the low shift code element terminates and the relay R1 is deenergized.

The dropping away of the relay R1 removes energy from the off-time detector 75 by the opening of the front contact 98. The trigger circuit 73 is connected to the output wire 70 by the closing of the back contact 71 of relay 3CY to render the trigger circuit 73 again responsive to subsequent high shift scanning pulses transmitted from the central office.

*Indication cycle*

As previously mentioned, a field station is able to transmit an indication cycle to the central office only in response to a particular scanning pulse following the synchronizing or reset period; and then only if the field station has a stored start.

Figure 9:
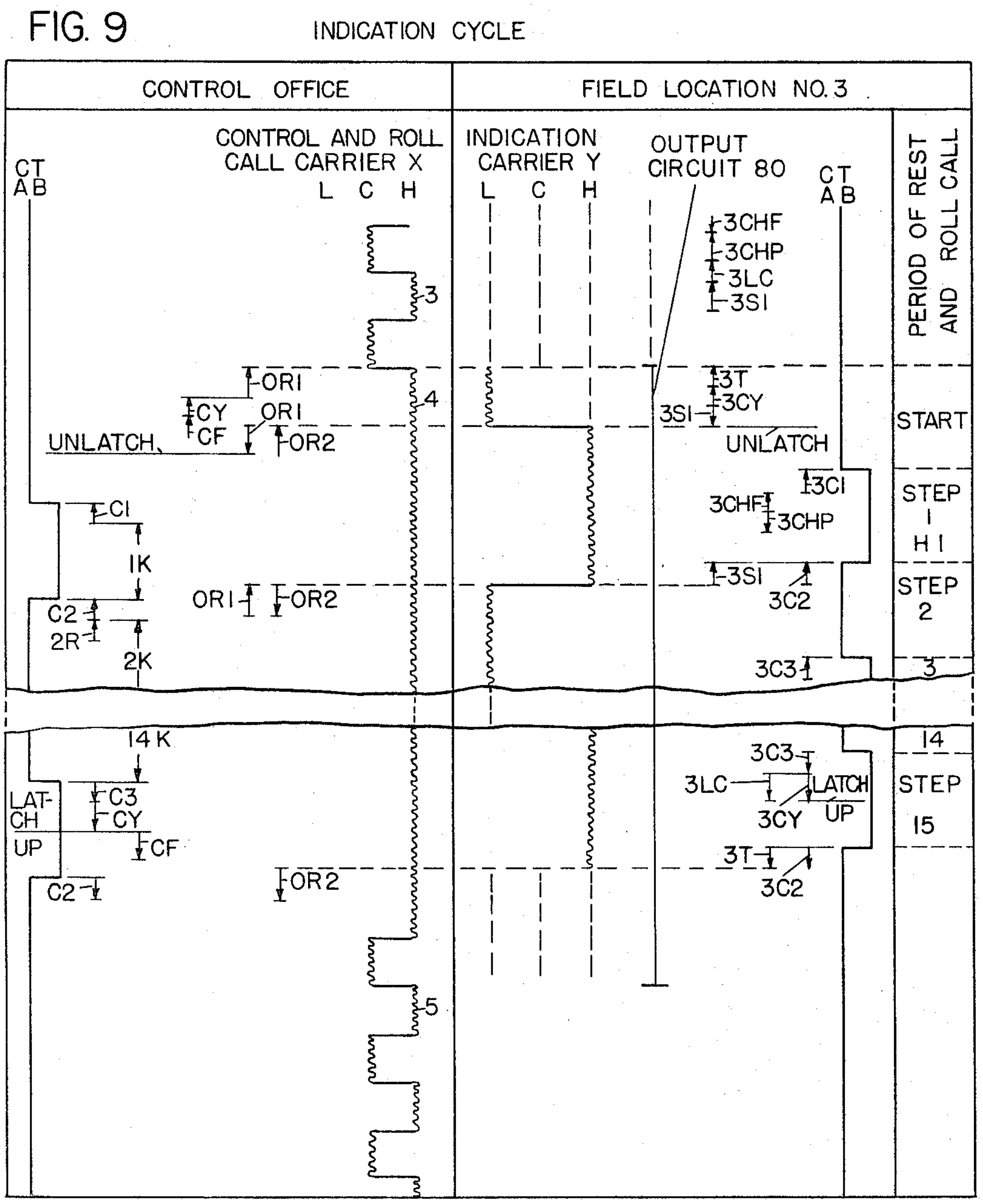
FIG. 9 is a sequence chart showing the operation of various elements at the central office and one of the field stations during an indication code cycle.

Referring to FIGS. 4A and 4B, with reference to the sequence chart of FIG. 9, and assuming that field station No. 3 has registered a change in one of its associated devices, the relay 3CHF (FIG. 4B), which is normally energized by a stick circuit that extends from (+) and includes back contact 206 of the relay 3LSP, and either front or back contact 207 and front or back contact 208 of conventional function relays, front contact 210 of the relay 3CHF and the winding of the relay to (−) is dropped away by the operation of a contact, such as 207 or 208, from front to back or back to front. When the relay 3CHF drops away, the relay 3CHP is energized by an obvious circuit over the back contact 210 of the relay 3CHF. Upon the picking up of the relay 3CHP, the relay 3LC is energized by a circuit which extends from (+) and includes back contact 211 of the relay 3CY, back contact 212 of the relay 3T, wire 213, front contact 214 of the relay 3CHP, the lower winding of the relay 3LC, and back contact 216 of stepping relay 3C2 to (−). Upon the picking up of the relay 3LC, the relay 3S1 is energized by a circuit which extends to (+) and includes front contact 217 of the relay CO, wire 218, front contact 220 of the relay 3LC, diode 221, wire 222, resistor 219, the lower winding of the relay 3S1, back contact 223 of the relay 3CY, and resistor 224 to (−).

When counter 24 responds to the reception of the proper scanning pulse, a negative output on wire 81 from output circuit 80 occurs which causes the transmitter 38 to transmit a low frequency pulse of the carrier frequency Y. This is caused by the application of the negative energy to wire 227 from wire 81, front contact 228 of the relay CO, front contact 230 of the relay 3S1, and front contact 231 of the relay 3S1. Simultaneously, the transmitting relay 3T is energized by a circuit which extends from (+) and includes back contact 232 of the relay R1, the upper winding of the relay 3T, front contact 231 of the relay 3S1, front contact 230 of relay 3S1, front contact 228 of relay CO, to the negative potential on wire 81. The negative energy remains on wire 81 throughout the cycle as will be apparent hereinafter.

In response to the picking up of the relay 3T, the relay 3CY is energized over a circuit which extends from (+) and includes the front contact 141 of the relay 3T, front contact 240 of the relay 3S1, the winding of the relay 3CY, the wire 143, and the back contact 144 of the stepping relay 3C2 to (−). The picking up of the relay 3CY causes the relay 3S1 to drop away by the opening of back contact 223 of the relay 3CY in the energizing circuit of the relay 3S1. Upon the dropping away of the relay 3S1 its front contact 231 opens which removes the energy from the wire 227, thus causing the transmitter 38 to terminate its low shift pulse. Simultaneously, the energizing circuit for the oscillator 3CT is interrupted by the opening of front contact 241 of the relay 3S1. The releasing or unlatching of the oscillator 3CT causes its contacts to oscillate between their A and B positions as previously described. In the present example, the first six digits are described as comprising the code elements corresponding to the address of the field location that is transmitting and steps 7 through 14 cause the transmission of code elements corresponding to the position of the various function relays associated with the transmitting field station.

Each step of the indication code cycle will be either a high or low frequency shift of the carrier Y from the transmitter 38. When the relay 3S1 is energized during a step of the code cycle, the code element will be a low frequency shift, and when the relay 3S1 is dropped away during a step of the indication code cycle the code element is a high frequency shift. When a low frequency shift is not being transmitted because the front contact 231 of the relay 3S1 is opened the transmitter 38 is caused to transmit a high frequency shift by applying negative energy to the wire 242 from front contact 243 of the relay 3T, back contact 230 of the relay 3S1, front contact 228 of the relay CO, and the output wire 81 of circuit 80. After the relay 3T is picked up, the operation of the relay 3S1 is determined by the presence or absence of positive energy during each step of the cycle in accordance with the presence or absence of energy on the output wires 1K through 14K respectively. The individual channels 1K through 14K are selected in sequence in a well known manner by the operation of the contacts 165 of the oscillator 3CT between their A and B positions in cooperation with the operation of the stepping relays 3C1 through 3C4 as illustrated in FIG. 3.

The first step of the indication cycle in this example is a high frequency code element, which causes the relay 3CHF to be restored to its normally energized position by the completion of an obvious circuit connected to the output wire 1K. The steps 2K through 6K are connected in a well known manner in accordance with the address of its field station. In the present example, as shown in FIGS. 4A and 4B, wire 245 which supplies the energy to operate the relay 3S1 during appropriate steps of the indication cycle is connected to the output wires 2K, 3K, 5K and 6K which causes these steps of the cycle to be a low frequency code element. The remaining steps 7K through 14K energize the wire 245 in accordance with the position of the devices to be indicated.

In step fifteen of the indication code cycle stepping relay 3C3 drops away, its front contact 206′ opens, and opens the energizing circuit for the relay 3CY. The dropping away of the relay 3CY causes its back contact 152 to close which energizes the oscillator 3CT to its latched up position at the end of the step. The relay 3LC also drops away in step No. fifteen because of the opening of the front contact 199 of the relay 3C3. When the contact 165 of the relay 3CT latches up in its A position, at the end of the fifteenth step, the relay 3T drops away to terminate the transmission of the indication cycle. The relay 3T is held up during the fifteenth step after the relay 3CY drops away by an obvious circuit which extends from terminal 15K (FIG. 4A) that is energized only in the fifteenth step of the cycle. Upon the dropping away of the relay 3T the transmitter 38 ceases transmission of the carrier Y.

In the last step of the cycle, the relay 3S1 is dropped away in as much as the relay 3T is energized by virtue of the output from the indication terminal 15K (FIG. 4A). However, when the relay 3T drops away at the end of the fifteenth step of the indication cycle, the relay 3S1 cannot pick up if there is a stored start because the negative output on wire 81 from the output circuit 80 provides a blocking circuit to prevent such occurrence. This blocking circuit extends from wire 81 and includes front contact 228 of relay CO, back contact 230 of the relay 3S1, back contact 243 of the relay 3T to right sides of the winding of the relay 3S1. With negative present on the left side through back contact 223 of relay 3CY the relay 3LC cannot complete the circuit for picking up the relay 3S1 if there is a negative output on the wire 81 from the output circuit 80. As mentioned elsewhere herein the negative potential on wire 81 cuts off in response to the next scanning pulse. This is not only important in assuming that each field station cannot repeat its indication cycle if a start was stored during the transmission of a cycle, but it also prevents the initiation of a cycle if a change should occur during a scanning pulse. If a change should occur in the middle of a scanning pulse, there may not be sufficient time for the first low frequency shift of the carrier Y at the beginning of the indication cycle to be felt at the office for prolonging the scanning pulse as previously mentioned. In other words an indication cycle starts only if the 3S1 relay was picked up prior to the beginning of the leading edge of the appropriate scanning pulse.

Referring to FIGS. 2A and 2B, at the beginning of the indication cycle a low shift pulse of carrier Y is received at the central office, and wire 250 is energized with positive potential. This causes relay OR1 to be energized by a circuit which extends from wire 250 and includes the winding of the relay OR1 to (−). Simultaneously, the flip-flop circuit 52 is held in the position to provide an output on wire 57 by energy received from the carrier detector output of the receiver 40 and includes the RC network (FIG. 2B), wire 66 and the input of the gate 51 for preventing the pulse generator 18 from operating flip-flop 52 to another position. Thus, the reception of the first carrier (low) pulse detected by the receiver 40 causes the transmitter 12 to continue sending that high shift scanning pulse of carrier Y which caused the field station No. 3 to transmit the low shift pulse of carrier Y. The transmission of this high scanning pulse, which in this example is the fourth pulse after the reset period continues to be transmitted until the central office clears out at the end of an indication cycle. As previously mentioned, the continued reception of this high frequency scanning pulse causes the counters at all of the field stations to remain in the condition caused by the initial reception of the high scanning pulse.

In response to the picking up of the relay OR1, the relay CY is energized by a circuit which extends from (+) and includes the back contact 106 of the relay T, front contact 254 of the relay OR1, the wire 108, the winding of the relay CY, and back contact 90 of the stepping relay C2 to (−). In response to the picking up of the relay CY, the relay CF is energized to condition the circuitry for the reception of an indication cycle. This circuit extends from (+) and includes the winding of the relay CF, front contact 255 of the relay CY, wire 256, and back contact 257 of the relay T to (−). The picking up of the relay CF causes its back contact 118 to open for disconnecting the control cycle channels 1C through 14C from contacts of the stepping relays C1 through C4, and to cause its front contact 258 to close for connecting contacts of the stepping relays C1 through C4 to the indication terminals 1K through 14K. When the first low shift carrier pulse is removed, the oscillator CT is released by the opening of the front contact 252 of the relay OR1. The oscillator CT and the oscillator 3CT are now operating synchronously, as mentioned previously, to energize the input terminals 1K through 14K in succession in accordance with the reception of either a high or low frequency shift as detected by receiver 40. In the present example, the first digit of the indication cycle is a high shift which causes the picking up of the relay OR2 because of energy being applied to wire 260, which is connected in a circuit through the winding of the relay OR2 to (—). The respective indication channels 1K through 14K, during respective steps of the indication cycle, are either energized positively or negatively in accordance with the code received.

In the present example, the first six steps or digits of the indication cycle are reserved for identifying the field station transmitting, and the address relays 1R, 2R, and 3R are either energized or deenergized in accordance with the code. On either the fifth or sixth step of the indication cycle the relay LRL or LRH is energized in accordance with the code received to complete the circuit for energizing the station relay, such as 3ST. In the present example, the 3ST relay is picked up in response to the picking up of the LRL relay in step No. six of the indication cycle in response to a low shift pulse. The detailed circuitry for operating the address relays 1R through 3R and the stick relays LRL and LRH and the station relays such as 3ST is obvious from FIGS. 2A and 2B. The remaining steps 7K through 14K of the cycle are reserved for indicating the condition of the various apparatus associated with the particular transmitting field station. This is exemplified by conventional indication relays 3NWK and 3RWK connected to the terminal 7K and 8K for indicating the normal or reverse position of the switch 3SW.

At the beginning of step No. fifteen of the indication cycle, the relay CY drops away upon the opening of front contact 132 of the stepping relay C3, which energizes the oscillator CT by the closing of back contact 110 in its previously described energizing circuit. The dropping away of the relay CY deenergizes the relay CF by the opening of front contact 255 of the relay CY. The dropping away of the relay CY also opens the stick circuit for the address relays 1R through 3R restoring the circuitry at the central office to normal.

When the field station No. 3 ceases transmitting, the relays OR1 and OR2 are dropped away and energy is removed from the wire 66 to the input of the gate 51, thereby permitting the pulse generator 18 to operate the flip-flop circuit 52 to its position to remove effective energy from wire 57 thereby ending the transmission of the scanning pulse No. 3 and to resume the transmission of succeeding high shift scanning pulses as hereinbefore described.

Figure 5A:
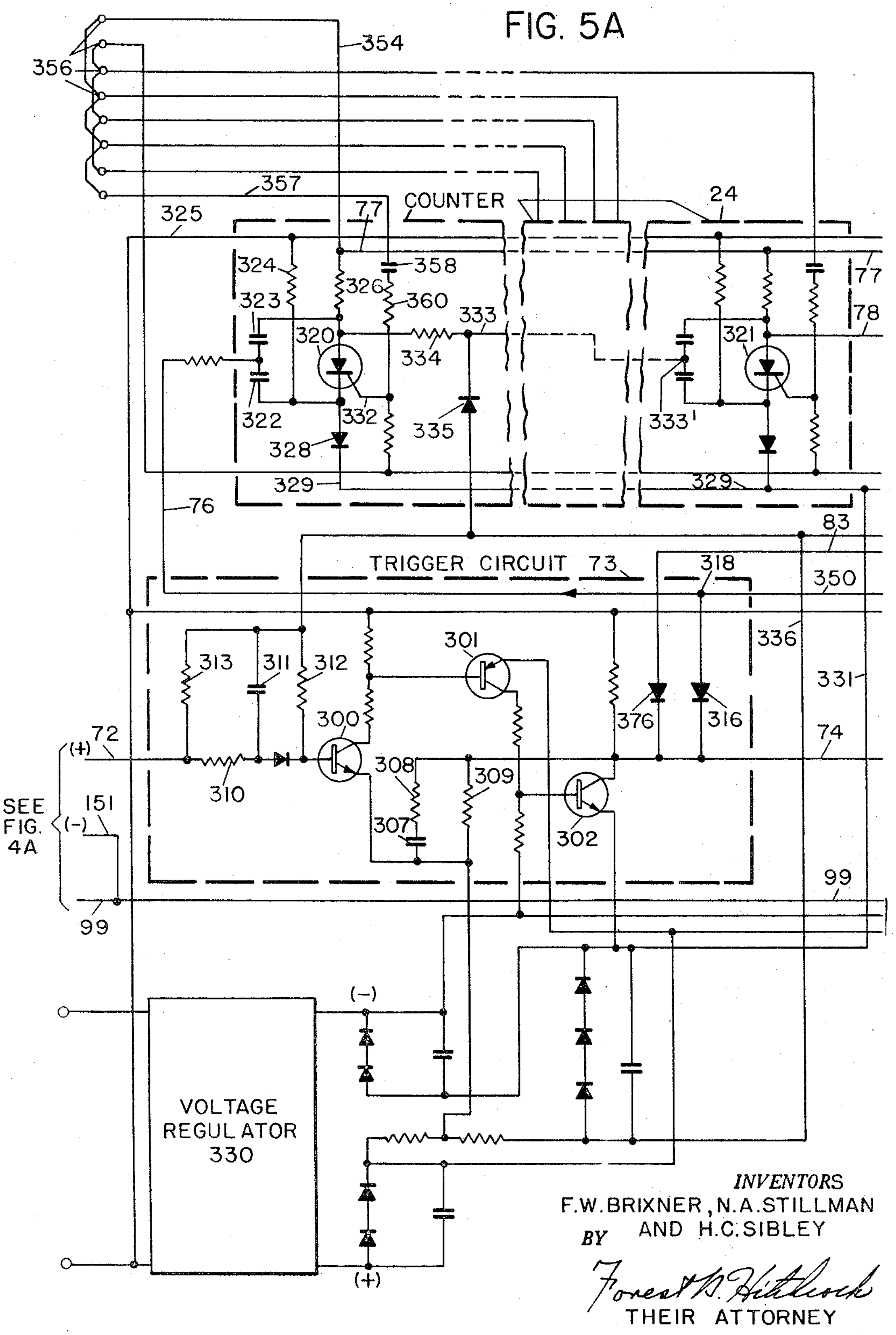
Figure 5B:
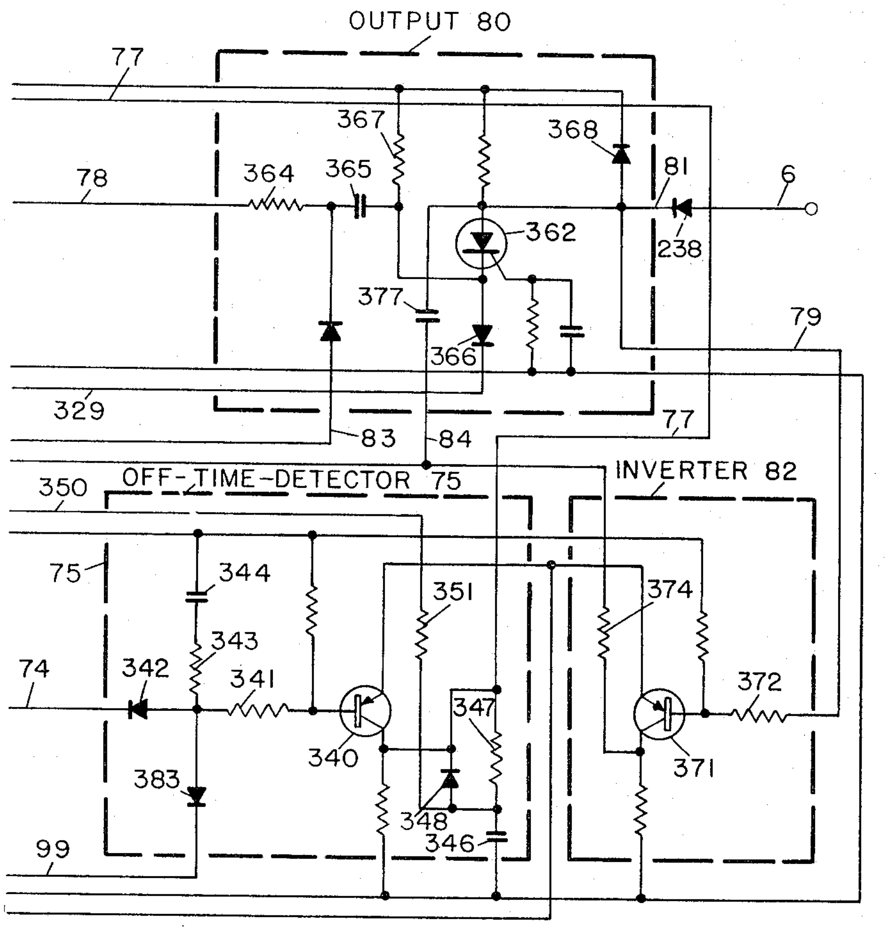

With reference to FIGS. 5A and 5B, and the waveforms of FIG. 7, various details and circuit connections including the trigger circuit 73, the counter 24, the output circuit 80, the off-time detector 75, and the inverter 82, which are illustrated in block form in FIG. 4A, will now be described.

The trigger circuit 73 is comprised of an NPN transistor 300, a PNP transistor 301, and a NPN transistor 302, which are connected in a well known Schmitt trigger circuit arrangement. Capacitor 307, resistor 308, and resistor 309 are connected in a well known positive feedback network between the collector of the transistor 302 and the emitter of the transistor 300 to provide the snap action effect characteristic of this type of trigger circuit. The transistors 300, 301 and 302 are turned "on" in response to a positive pulse applied to the input wire 72 from the receiver 14 and turned "off" upon cessation of each positive pulse. The positive pulses are represented at 72B of FIG. 7. A low pass network comprising resistor 310, capacitor 311, and resistor 312, may be included to prevent any short transient surges from operating the trigger circuit 73. Resistor 313 is merely a load resistor for the receiver 14. Each time the trigger circuit 73 turns "on" in response to a positive pulse, the output wire 74 goes negative. This is represented at 74A of FIG. 7. The output wire 74 is connected to the input of the off-time detector 75, and is also connected through a diode 316 to the counter drive wire 76 at junction point 318 for driving the first stage of the counter 24. The counter 24 is driven each time the input wire 76 goes negative as represented by the waveform 24A of FIG. 7.

The counter 24 is comprised of a plurality of individual stages, each of which includes a silicon controlled rectifier such as illustrated at 320 and 321. Because each stage of the counter 24 is similar, only those two stages illustrating the rectifiers 320 and 321 are shown. The counter 24 is in effect a scale-of-two divider, that is, one negative input pulse turns "on" each stage, and the next negative input pulse turns "off" the first stage. The first stage provides the pulse for operating the next stage only when the first stage turns "on," and the next stage provides a driving pulse for the third stage only when the preceding stage turns "on." Thus, the first stage turns "on" and "off" in response to each input pulse, the second stage turns "on" and "off" in response to every other input pulse, and so on in a manner well known in the art.

The input wire 76 for operating the first stage of the counter 24 is connected between capacitors 322 and 323. The capacitors 322 and 323 are connected across the anode and cathode terminals of the silicon-controlled rectifier 320. These capacitors, which permit the anode and cathode terminals of the rectifier 320 to detect only a change in current on the wire 76, are of different values. The capacitor 323 is larger than the capacitor 322, and thus a negative pulse on the wire 76 is effective to turn the rectifier 320 "off" when it is "on" and the next negative pulse turns it "on" when it is nonconducting. A resistor 324 connected to positive bus 325 provides a positive bias on the cathode terminals of the rectifier 320 so that a predetermined amount of negative energy on wire 76 is required to turn it "on." The anode of the rectifier 320 is connected through a load resistor 326 to the output wire 77 from the off-time detector 75, which wire is energized with positive potential when the off-time detector is "on" as will be described hereinafter. The cathode terminal of the rectifier 320 is connected through a diode 328 to a wire 329 that is connected to the negative output of a voltage regulator 330 by wire 331. The silicon-controlled rectifier 321 is similarly connected.

In response to a negative pulse on wire 76 from the trigger circuit 73, when the silicon-controlled rectifier 320 is "off," the cathode terminal is made more negative which in effect renders gating terminal 332 more positive and the rectifier 320 turns "on." When it turns "on," wire 333 which is connected through a resistor 334 to a junction point such as 333′, which for the purposes of description is assumed to be the input of the next stage of the counter 24, goes negative and the silicon rectifier such as 321 is operated to either its "off" or "on" condition as the case may be. With the rectifier 320 turned "on," the next time wire 76 goes negative, the anode terminal becomes more negative momentarily which turns the rectifier 320 "off." The turning "off" of the rectifier 320 causes the wire 333 to go more positive and thus does not affect the next stage of the counter. The momentary negative pulse at the anode terminal is bypassed through a diode 335 which is connected to a positive bus wire 336 from the voltage regulator 330 to prevent the next stage from inadvertently operating when the preceding stage turns "off."

The off-time detector 75 is comprised of a transistor 340, the base of which is connected through a current limiting resistor 341 and a diode 342 to the output wire 74 from the trigger circuit 73. When the transistor 340 is turned "on" in response to a negative pulse on wire 74 its collector terminal goes positive. The collector terminal of the transistor 340 is connected to the anode terminals of the rectifier, such as 320 and 321 by the wire 77. This detector 75 is normally kept in its "on" condition by the repetitive negative pulses on the wire 74. Resistor and capacitor 343 and 344 respectively provide a time constant for preventing the transistor 340 from turning "off" between negative pulses occurring at a normal scanning rate from wire 74.

A capacitor 346 and resistor 347 together with a diode 348 constitutes a wave shaping network which permits a rapid positive going pulse and a relatively slow neagtive going pulse on wire 77 when the detector 75 turns "on" and "off" respectively. The counter drive bus or wire 76 is connected at junction point 318 to a wire 350 and a resistor 351, which is connected between the capacitor 346 and resistor 347 and the diode 348 to the collector terminal of the transistor 340. Thus, the drive bus 76 is rendered positive by the transistor 340 when it is conducting. The capacitor 346 and resistor 347 are provided so that the counter drive bus 76 will not become positive as quickly as the anode supply bus 77 when the transistor 340 turns "on" at the end of the reset period. The potential on the anode supply bus 77 is represented by waveform 77A of FIG. 7. The turning "off" of the detector 75 is represented at 77B; and the turning "on" of the detector 75 is represented at 77C of FIG. 7. Waveform 350A illustrates the potential on wire 350. Thus it is seen that the turning "off" of the detector 75 referred to at 350B is similar to 77B, but the turning "on" of the detector 75 causes a slower rise in potential as shown at 350C, than on the wire 77 which is referred to at 77C of FIG. 7.

When the base of the transistor 340 goes positive, in the absence of neagtive energy for a predetermined length of time in accordance with its time constant, the transistor 340 turns "off" which removes positive energy from the wire 77 and thereby removes the anode supply voltage to all of the silicon controlled rectifiers of the counter 24. Thus, the turning "off" of the detector 75 turns off every stage of the counter. This occurs at the end of each scanning cycle in order to thereafter reset and synchronize the counters at each field station to a predetermined condition as previously described.

In response to the first pulse after this reset or synchronizing period, the transistor 340 is turned "on" and positive energy is supplied over wire 77 to provide the normal anode supply to the silicon-controlled rectifiers of the counter 24. Energy is simultaneously supplied to a wire 354 that is connected through jumper connections referred to at 356 for supplying reset energy to the gating terminals of the silicon controlled rectifiers of certain stages of the counter. These various stages are turned "on" in a certain combination in response to the first pulse at the end of the reset period so that the associated output circuit, such as 80 connected to each counter, such as 24 provides an effective output after the reception of a predetermined number of counter drive pulses. In the present example, it is seen that this positive energy from the off-time detector 75 is applied through the jumper connections 356 to a wire 357, capacitor 358 and resistor 360 to the gate terminal 332 of the silicon controlled rectifier 320 to turn it "on" in response to the first pulse.

This first scanning pulse does not drive the counter, because the drive wire 76 must be at positive potential when the wire 76 goes negative in response to a negative pulse on wire 74 from the trigger circuit 73. Because of the slow rise in positive potential on the wire 76 hereinbefore mentioned in response to the turning "on" of the transistor 340 and a clamping diode 316 connected between wire 74 and the junction point 318, the first negative pulse on the wire 74 is ineffective to cause the diode 316 to conduct to drive the first stage of the counter. The next and subsequent pulses of the scanning cycle operate the counter 24 as previously described.

The output circuit or stage 80, which is comprised of a silicon controlled rectifier 362 connected in a trigger circuit arrangement is turned "on" after the counter 24 has been driven by a predetermined number of scanning pulses. Negative energy applied to the wire 78 at the output of that stage of the counter 24 that includes the rectifier 321 when it turns "on" is conducted through a resistor 364 and capacitor 365 to cause the cathode terminal of the silicon controlled rectifier 362 to become more negative thereby turning "on" the rectifier 362. This negative spike for turning "on" the output circuit 80 is represented at 78A of FIG. 7. The conduction of the rectifier 362 permits the negative energy on the wire 329 to conduct through diode 366, resistor 367, and diode 368 for application to the wire 81 and the diode 238 (FIG. 4A); thereby providing the negative potential for initiating an indication cycle as hereinbefore described if there is already a stored start at the field station. This negative potential, which continues until the reception of the next scanning pulse is represented at 80A of FIG. 7.

In response to the turning "on" of the output trigger circuit 80 the wire 79 that is connected between the anode terminal of the rectifier 362 and the base terminal of a transistor 371 through a resistor 372, becomes more negative, which causes the transistor 371 to conduct. The transistor 371 is connected to constitute the inverter circuit 82. The conducting of the transistor 371 causes its collector terminal to become positive, which is represented by 82A and 82B of FIG. 7. The inverter circuit 82, which repeats the operation of the output circuit 80, when turned "on" applies a positive potential from the collector terminal of the transistor 371 through a resistor 374 to the wire 83 and the positive side of the diode 376. The negative side of the diode 376 is connected to the wire 74 at the output of the trigger circuit 73. When wire 74 goes negative in response to the scanning pulse, after the one which caused activation of output circuit 80, the diode 376 conducts causing capacitor 377, which is connected to the wire 83, and the wire 84 to discharge, and provide a negative going pulse to the anode terminal of the rectifier 362 thereby turning it "off." This negative going pulse is represented at 380A and 380B of FIG. 7. The pulse 380A represents the turning "off" of the output circuit 80 after an indication cycle, and 380B represents the turning "off" of the output circuit 80 after a normal station count.

When a control cycle is initiated, as previously described, and the scanning pulses stop, the off-time detector 75 is maintained in its "on" condition by the application of negative energy to the wires 99 and 151 (FIG. 4A) and through diode 383 to the input or base of the transistor 340. Thus, the counter 24 is kept in the condition it reached on that scanning pulse just prior to the initiation of the control cycle. The negative energy applied to the base of the transistor 340 is represented at 340A of FIG. 7. At the end of the control cycle energy is removed from the base of transistor 340 from wires 99 and 151 and the scanning pulses commence as previously described.

To summarize briefly the operation of the apparatus of FIGS. 5A and 5B with reference to the waveforms of FIG. 7, the trigger circuit 73 provides a negative output pulse **74*a* in response to each scanning pulse 72B. Each pulse 74A causes one count on the counter 24 as represented by 24A as long as the drive circuit including the wire 76 and the anode supply wire 77 is energized with positive potential as illustrated by waveforms 77A and 77B. The off-time detector 75, which is "on" in response to the pulses 74A** occurring at a predetermined repetition rate, provides this positive potential to both the drive wire 76 and the anode supply wire 77. When the pulse 74A is not detected for a predetermined length of time at the end of a scanning cycle, the detector 75 turns "off," which causes the anode supply wire 77 and the drive wire 76 illustrated at 77B and 350B to go negative. The removal of energy from the anode supply wire 77 turns off every stage of the counter 24. At the end of the reset period and in response to the first scanning pulse, the off time detector 75 is turned "on," which applies rapid positive potential to the anode supply wire 77 as shown at 77C and simultaneously certain predetermined stages of the counter 24 are turned "on" in accordance with the identity of the field station. This first pulse, however, does not affect the drive wire 76 because the wire 76 does not reach its positive potential as rapidly as shown at 350C, and the effect of the negative pulse 74A is not detected by the counter 24 as represented at 24A because of the clamping action of the diode 316.

When the count for a field station is reached, the output circuit 80 turns "on" to produce a negative output on the wire 81 and 79 which causes the inverter circuit 82 to also turn "on." If there is no stored start at the particular field station, the next scanning pulse turns off the output circuit 80 because the inverter 82 is "on." If there is a stored start, the negative energy on wire 74 to the off-time detector 75 continues through the indication cycle because the scanning pulse that causes the output circuit 80 and the inverter 82 to turn "on" is prolonged until the reception of the scanning pulse following the indication cycle as described in connection with the apparatus shown in FIGS. 2A and 2B and 4A and 4B. When this scanning pulse terminates, the next pulse as represented at 380A or 380B turns the output circuit 80 "off" as mentioned previously.

Although, the present embodiment of the invention shows and describes a system wherein a plurality of field stations are connected by a signal line wire, it is contemplated that if desired a separate line wire may be used to connect each field station with the central office. In this event, each one of the line wires would be scanned in turn. It is further understood, that certain individual elements of this embodiment of the invention could be substituted by other well known elements for accomplishing the same result. For example, a crystal oscillator could very well be substituted for the mechanical oscillator CT which demarcates each step of the operating cycles, or circuits using vacuum tubes or other electronic devices could be substituted for the solid state circuitry shown in the present embodiment.

It is further apparent, that the system according to the present invention can be modified to provide for so-called double cycling or to provide control and indication cycles having a larger or smaller number of steps. Although a frequency shift type of code transmission is used herein it is understood that other types of modulation or definitions of code pulse may be used.

Although we have shown and described one specific form of the present invention, it is understood that other adaptations and modifications may be made without departing from the spirit or scope of the present invention.

What we claim is:

1. A system of two-way communication over a communication channel connecting a control office and a plurality of remote field stations wherein the system is operable at times during a control cycle to transmit selected codes from the control office to the field stations and at other times during an indication cycle to transmit selected indication codes from one of the field stations to the control office comprising, roll call transmitting means at the control office for normally transmitting over said communication channel successive series of relatively short time spaced roll call pulses for quickly scanning the field stations, there being only one pulse for each field station in each series of pulses, control designating means at the control office for designating the start of a control cycle, indication designating means at each of the field stations for designating the start of an indication cycle, control code transmitting means at the control office controlled jointly by said control designating means and by said roll call transmitting means for initiating a control cycle of operation for transmission over the communication channel of selected control code pulses for a selected field station, said control code transmitting means being rendered operable to transmit only during a time space between the roll call pulses, and indication code transmitting means for each of the field stations controlled jointly by said indication designating means and said roll call pulses for initiating an indication cycle of operation for transmission over the communication channel of selected indication pulses, said indication code transmitting means being rendered effective only during the reception at the associated station of a particular roll call pulse, said roll call transmitting means at the control office being controlled to extend the duration of a roll call pulse to cover the time of transmission of indication code during an indication cycle.

2. The invention according to claim 1 wherein gating means is provided at the control office for stopping transmission of roll call pulses during the next time space after designation of a control cycle start for the duration of the control cycle.

3. The invention according to claim 1 wherein gating means is provided at the control office for continuing the transmission of a roll call pulse for the duration of an indication cycle in response to the initiation of an indication cycle during transmission of that pulse.

4. A system of two-way code communication over a communication channel connecting a control office and a plurality of remote field stations wherein the system is operable at times during a control cycle to transmit selected codes from the control office to the field stations and at other times during an indication cycle to transmit selected indication codes from one of the field stations to the control office comprising, roll call transmitting means at the control office for normally transmitting over said communication channel successive series of relatively short time spaced roll call pulses for quickly scanning the field stations, receiving means at each of the field stations for receiving said roll call pulses, a counter at each of the field stations for counting the roll call pulses of each series, an off time detector at each field station for detecting a relatively long time space marking the end of each series of roll call pulses, means controlled by said off time detector for resetting said counter, and means for rendering said detector ineffective to reset said counter in response to a long time space in said series of roll call pulses when the system is in a cycle of operation.

5. The invention according to claim 4 wherein said counter resetting means becomes effective to reset the counter at the associated station during the next roll call pulse following the detection by said off time detector of an abnormal time space.

6. The invention according to claim 4 wherein said counter counts all pulses transmitted in a series of roll call pulses except the first roll call pulse of each series.

7. A system for communication over a communication channel connecting a control office and a plurality of remote field stations wherein the system is operable when initiated to transmit during an indication cycle a selected indication code from any one of the field stations comprising, roll call transmitting means at the control office for normally transmitting over said communication channel successive series of relatively short time spaced roll call pulses for quickly scanning the field stations, there being respective pulses of a series for calling the several field stations, code transmitting means at each of the field stations operable when rendered active to transmit a selected indication code during an indication cycle of operation, start registration means at each field station for registering a start for transmission of a stored indication code, control means for rendering said code transmitting means active in response to said start registration means only provided the roll call pulse for calling that station is being received over the communication channel, means at the control office responsive to the initiation of an indication cycle for sustaining the then transmitted roll call pulse until the end of the indication cycle, and means for preventing the start registration means from starting a second cycle in response to the roll call pulse that is sustained throughout transmission during a first indication cycle.

References Cited by the Examiner

UNITED STATES PATENTS

| | | | |
|---|---|---|---|
| 2,574,774 | 11/1951 | Baughman | 340—163 |
| 2,629,088 | 2/1953 | Kendall | 340—162 |
| 2,719,284 | 9/1955 | Roberts et al. | 340—151 |
| 2,786,938 | 3/1957 | Coley et al. | 340—163 X |
| 3,007,136 | 10/1961 | Tyrlick | 340—147 |
| 3,035,248 | 5/1962 | Grose et al. | 340—163 |

NEIL C. READ, *Primary Examiner.*

L. HOFFMAN, H. PITTS, *Assistant Examiners.*